US008825387B2

(12) United States Patent
Mays et al.

(10) Patent No.: US 8,825,387 B2
(45) Date of Patent: *Sep. 2, 2014

(54) POSITIONING OPEN AREA MAPS

(75) Inventors: Joseph P. Mays, Chicago, IL (US);
Peter A. Seegers, Evanston, IL (US);
William N. Gale, Oak Park, IL (US);
Matei N. Stroila, Chicago, IL (US)

(73) Assignee: Navteq B.V., Veldhoven (NL)

( * ) Notice: Subject to any disclaimer, the term of this patent is extended or adjusted under 35 U.S.C. 154(b) by 487 days.

This patent is subject to a terminal disclaimer.

(21) Appl. No.: 12/179,692

(22) Filed: Jul. 25, 2008

(65) Prior Publication Data
US 2010/0023252 A1    Jan. 28, 2010

(51) Int. Cl.
*G01C 21/20* (2006.01)
*G01C 21/00* (2006.01)
*G01C 21/34* (2006.01)

(52) U.S. Cl.
CPC .................. *G01C 21/206* (2013.01); *G01C 21/3423* (2013.01)
USPC ............. 701/433; 701/434; 701/459

(58) Field of Classification Search
CPC .................. G01C 21/206; G01C 21/3423
USPC ......... 701/200, 201, 207, 208, 211, 433, 434, 701/541, 300, 301; 340/955.1
See application file for complete search history.

(56) References Cited

U.S. PATENT DOCUMENTS

| | | | |
|---|---|---|---|
| 4,674,048 A * | 6/1987 | Okumura | 701/25 |
| 4,674,773 A | 6/1987 | Stone et al. | |
| 4,847,773 A * | 7/1989 | van Helsdingen et al. | 701/25 |
| 5,032,775 A | 7/1991 | Mizuno et al. | |
| 5,161,886 A | 11/1992 | De Jong et al. | |
| 5,202,661 A | 4/1993 | Everett, Jr. et al. | |
| 5,272,638 A | 12/1993 | Martin et al. | |
| 5,305,217 A | 4/1994 | Nakamura et al. | |
| 5,448,696 A * | 9/1995 | Shimada et al. | 715/853 |
| 5,491,641 A | 2/1996 | Scepanovic et al. | |
| 5,764,510 A * | 6/1998 | Cameron et al. | 700/56 |

(Continued)

FOREIGN PATENT DOCUMENTS

| | | |
|---|---|---|
| CN | 101099404 | 1/2008 |
| EP | 1150100 | 10/2001 |

(Continued)

OTHER PUBLICATIONS

"Introduction to A" From Amit's Thoughts on Pathfinding at http://theory.stanford.edu/~amitp/GameProgramming/AStarComparison.html#dijkstras-algorithm-and-best-first-search as viewed on a way back machine capture dated Jun. 20, 2007.*

(Continued)

*Primary Examiner* — John Q Nguyen
*Assistant Examiner* — Michael Whalen
(74) *Attorney, Agent, or Firm* — Lempia Summerfield Katz LLC

(57) ABSTRACT

Open area maps as well as related features, systems, and methods are disclosed. For example, one method comprises translating coordinates associated with an open area map into real-world coordinates. The open area map is positioned within a geographic map as a function of the real-world coordinates. The geographic map represents a real-world area around the open area map. The open area map includes an image of a layout representing a pedestrian walkable area, and the open area map is configured to provide point-to-point routing within the layout.

27 Claims, 10 Drawing Sheets

(56) References Cited

U.S. PATENT DOCUMENTS

| | | | |
|---|---|---|---|
| 5,842,145 A * | 11/1998 | Zimmer | 701/201 |
| 5,938,720 A | 8/1999 | Tamai | |
| 6,038,559 A | 3/2000 | Ashby et al. | |
| 6,167,332 A | 12/2000 | Kurtzberg et al. | |
| 6,240,363 B1 | 5/2001 | Theimer et al. | |
| 6,259,990 B1 * | 7/2001 | Shojima et al. | 701/209 |
| 6,269,291 B1 * | 7/2001 | Segeren | 701/25 |
| 6,272,237 B1 * | 8/2001 | Hashima | 382/153 |
| 6,321,158 B1 | 11/2001 | DeLorme et al. | |
| 6,604,126 B2 * | 8/2003 | Neiman et al. | 709/203 |
| 6,650,975 B2 | 11/2003 | Ruffner | |
| 6,687,610 B2 * | 2/2004 | Hashida | 701/516 |
| 6,728,636 B2 | 4/2004 | Kokojima et al. | |
| 6,782,319 B1 * | 8/2004 | McDonough | 701/208 |
| 6,841,963 B2 | 1/2005 | Song et al. | |
| 6,954,153 B2 | 10/2005 | Choi | |
| 7,031,725 B2 | 4/2006 | Rorabaugh | |
| 7,058,504 B2 * | 6/2006 | McDonough | 701/200 |
| 7,062,377 B2 * | 6/2006 | McDonough | 701/208 |
| 7,260,474 B1 | 8/2007 | Thayathil et al. | |
| 7,272,492 B2 | 9/2007 | McCubbin et al. | |
| 7,308,118 B1 * | 12/2007 | Meadows | 382/113 |
| 7,376,510 B1 | 5/2008 | Green | |
| 7,386,163 B2 * | 6/2008 | Sabe et al. | 382/153 |
| 7,389,210 B2 | 6/2008 | Kagarlis | |
| 7,421,341 B1 | 9/2008 | Hopkins et al. | |
| 7,439,878 B2 | 10/2008 | Kato et al. | |
| 7,457,262 B1 * | 11/2008 | Doshi et al. | 370/328 |
| 7,483,917 B2 * | 1/2009 | Sullivan et al. | 1/1 |
| 7,496,445 B2 | 2/2009 | Mohsini et al. | |
| 7,512,485 B2 | 3/2009 | Hudson et al. | |
| 7,543,882 B2 | 6/2009 | Day et al. | |
| 7,587,274 B2 * | 9/2009 | Kaldewey et al. | 701/208 |
| 7,598,966 B2 * | 10/2009 | Rye et al. | 345/617 |
| 7,633,383 B2 | 12/2009 | Dunsmoir et al. | |
| 7,660,441 B2 * | 2/2010 | Chen et al. | 382/113 |
| 7,672,778 B1 | 3/2010 | Elliott | |
| 7,711,687 B2 | 5/2010 | Rappaport et al. | |
| 7,719,542 B1 | 5/2010 | Gough et al. | |
| 7,751,971 B2 | 7/2010 | Chang et al. | |
| 7,765,499 B2 | 7/2010 | De Graeve et al. | |
| 7,769,491 B2 * | 8/2010 | Fukuchi et al. | 700/253 |
| 7,801,904 B2 | 9/2010 | Natesan et al. | |
| 7,856,312 B2 | 12/2010 | Coombes et al. | |
| 7,865,267 B2 * | 1/2011 | Sabe et al. | 700/245 |
| 7,873,469 B2 | 1/2011 | D'Andrea et al. | |
| 7,916,690 B2 * | 3/2011 | Doshi et al. | 370/328 |
| 7,953,551 B2 * | 5/2011 | Park et al. | 701/416 |
| 7,957,894 B2 * | 6/2011 | Wellmann | 701/428 |
| 8,000,892 B2 * | 8/2011 | Banerjee | 701/209 |
| 8,050,521 B2 * | 11/2011 | Judelson | 382/293 |
| 8,099,237 B2 * | 1/2012 | Mays et al. | 701/434 |
| 8,229,176 B2 * | 7/2012 | Seegers et al. | 382/113 |
| 8,270,769 B2 * | 9/2012 | Judelson | 382/293 |
| 8,339,417 B2 * | 12/2012 | Stroila et al. | 345/629 |
| 8,374,780 B2 * | 2/2013 | Mays et al. | 701/433 |
| 8,396,257 B2 * | 3/2013 | Seegers et al. | 382/113 |
| 8,594,930 B2 * | 11/2013 | Mays et al. | 701/454 |
| 2001/0051851 A1 * | 12/2001 | Suzuki et al. | 701/208 |
| 2002/0061755 A1 | 5/2002 | Nohara et al. | |
| 2002/0128771 A1 | 9/2002 | Nagaki | |
| 2002/0168084 A1 | 11/2002 | Trajkovic et al. | |
| 2003/0055556 A1 * | 3/2003 | Hashida | 701/207 |
| 2003/0060978 A1 | 3/2003 | Kokojima et al. | |
| 2003/0210139 A1 | 11/2003 | Brooks et al. | |
| 2004/0113937 A1 | 6/2004 | Sawdey et al. | |
| 2004/0193369 A1 | 9/2004 | Kokojima et al. | |
| 2005/0000543 A1 * | 1/2005 | Taylor et al. | 134/18 |
| 2005/0038578 A1 | 2/2005 | McMurtry et al. | |
| 2005/0102097 A1 | 5/2005 | Tanizaki et al. | |
| 2005/0131581 A1 | 6/2005 | Sabe et al. | |
| 2006/0058950 A1 | 3/2006 | Kato et al. | |
| 2006/0149465 A1 * | 7/2006 | Park et al. | 701/209 |
| 2006/0241827 A1 * | 10/2006 | Fukuchi et al. | 701/23 |
| 2007/0001904 A1 | 1/2007 | Mendelson | |
| 2007/0093955 A1 | 4/2007 | Hughes | |
| 2007/0118821 A1 | 5/2007 | Yee et al. | |
| 2007/0219711 A1 * | 9/2007 | Kaldewey et al. | 701/208 |
| 2007/0233367 A1 | 10/2007 | Chen et al. | |
| 2007/0253640 A1 * | 11/2007 | Brett | 382/276 |
| 2008/0062167 A1 * | 3/2008 | Boggs et al. | 345/419 |
| 2008/0091340 A1 | 4/2008 | Milstein et al. | |
| 2008/0183483 A1 | 7/2008 | Hart | |
| 2008/0220862 A1 * | 9/2008 | Axelrod et al. | 463/31 |
| 2008/0312819 A1 | 12/2008 | Banerjee | |
| 2009/0012667 A1 | 1/2009 | Matsumoto et al. | |
| 2009/0043504 A1 | 2/2009 | Bandyopadhyay et al. | |
| 2009/0063035 A1 | 3/2009 | Mandel et al. | |
| 2009/0088916 A1 | 4/2009 | Elgersma et al. | |
| 2009/0092113 A1 * | 4/2009 | Doshi et al. | 370/338 |
| 2009/0138353 A1 * | 5/2009 | Mendelson | 705/14 |
| 2009/0150790 A1 * | 6/2009 | Wilhelm | 715/737 |
| 2009/0153549 A1 | 6/2009 | Lynch et al. | |
| 2009/0164111 A1 * | 6/2009 | Hosoi et al. | 701/200 |
| 2009/0164896 A1 | 6/2009 | Thorn | |
| 2009/0201176 A1 | 8/2009 | Shimada et al. | |
| 2009/0237396 A1 | 9/2009 | Venezia et al. | |
| 2009/0267768 A1 * | 10/2009 | Fujiwara et al. | 340/572.1 |
| 2009/0292460 A1 * | 11/2009 | Kaldewey et al. | 701/200 |
| 2009/0292465 A1 * | 11/2009 | Kaldewey et al. | 701/209 |
| 2009/0300174 A1 * | 12/2009 | Floris et al. | 709/224 |
| 2009/0325595 A1 * | 12/2009 | Farris | 455/456.1 |
| 2010/0020093 A1 | 1/2010 | Stroila et al. | |
| 2010/0021012 A1 | 1/2010 | Seegers et al. | |
| 2010/0021013 A1 | 1/2010 | Gale et al. | |
| 2010/0023249 A1 | 1/2010 | Mays et al. | |
| 2010/0023250 A1 | 1/2010 | Mays et al. | |
| 2010/0023251 A1 | 1/2010 | Gale et al. | |
| 2010/0023252 A1 | 1/2010 | Mays et al. | |
| 2010/0057354 A1 * | 3/2010 | Chen et al. | 701/209 |
| 2010/0100323 A1 * | 4/2010 | Gnanasambandam et al. | 701/300 |
| 2010/0235350 A1 * | 9/2010 | Butler | 707/722 |
| 2010/0245912 A1 | 9/2010 | Mount et al. | |
| 2010/0275018 A1 | 10/2010 | Pedersen | |
| 2010/0299065 A1 | 11/2010 | Mays | |
| 2010/0324950 A1 * | 12/2010 | Merriam et al. | 705/7 |

FOREIGN PATENT DOCUMENTS

| | | |
|---|---|---|
| JP | 05334430 | 12/1993 |
| JP | 2000298034 | 10/2000 |
| JP | 2001-124582 | 5/2001 |
| JP | 2001-336947 | 12/2001 |
| JP | 2002-125052 | 4/2002 |
| JP | 2002-156243 | 5/2002 |
| JP | 2003240591 | 8/2003 |
| JP | 2005-092820 | 4/2005 |
| JP | 2005265464 | 9/2005 |
| JP | 2005-326944 | 11/2005 |
| JP | 2006-010563 | 1/2006 |
| JP | 2006-090818 | 4/2006 |
| JP | 2008-129093 | 6/2008 |
| JP | 2008-129695 | 6/2008 |
| WO | WO02-23128 | 3/2002 |
| WO | WO2007-100632 | 9/2007 |
| WO | WO2008024949 | 2/2008 |

OTHER PUBLICATIONS

Trier and Taxt. *Improvement of "Integrated Function Algorithm" for Binarization of Document Images*. University of Oslo, pp. 39-44, 1994. http://citeseerx.ist.psu.edu/viewdoc/summary?doi=10.1.1.51.4222.

Tombre, et al. *Text/Graphics Separation Revisited*. LORIA, pp. 1-12, 2002. http://www.loria.fr/~tombre/tombre-das02.pdf.

Rosin and West. *Segmentation of Edges into Lines and Arcs*. Image and Vision Computing, vol. 7 Issue 2: pp. 109-114, May 1989.

Agarwal and Sharir. *Arrangements and Their Applications*. Handbook of Computational Geometry, pp. 49-59, 1998. http://citeseerx.ist.psu.edu/viewdoc/summary?doi=10.1.1.52.4976.

Siu-hang Or, et al. *Highly Automatic Approach to Architectural Floorplan Image Understanding & Model Generation*. Proceedings

(56) References Cited

OTHER PUBLICATIONS of Vision, Modeling & Visualization in Erlangen, Germany, pp. 1-9, Nov. 2005. http://www.cse.cuhk.edu.hk/~shor/project/building/.
Wein, et al. *Chapter 20: 2D Arrangements*. CGAL, pp. 1-27, referenced on Mar. 2008. http://www.cgal.org/Manual/3.3/doc_html/cgal_manual/Arrangement_2/Chapter_main.html.
*Lanczos Resampling*. Wikipedia, pp. 1-2, referenced on Mar. 2008. http://en.wikipedia.org/wiki/Lanczos_resampling.
*Inkscape*. An Open Source Vector Graphics Editor, pp. 1-2, referenced on Jun. 2008. http://www.inkscape.org/.
Clark and DeRose, eds. *XML Path Language (XPath), Version 1.0*. W3, pp. 1-37, referenced on Jun. 2008. http://www.w3.org/TR/xpath.
Selinger. *Potrace: Transforming Bitmaps into Vector Graphics*. pp. 1-8. http://potrace.sourceforge.net/.
LaValle. *Planning Algorithms, Chapter 8: Feedback Motion Planning*. Cambridge University Press, pp. 369-433, 2006. http://planning.cs.uiuc.edu/.
Ishimaru, et al. "OWS-6 Outdoor and Indoor 3D Routing Services Engineering Report." 70th OGC Technical Committee. Darmstadt, Germany. Dated Sep. 30, 2009. pp. 1-30.
European Search Report for European Application No. EP 09251459, mailed Nov. 15, 2013.
European Search Report for European Patent Application No. EP 09251458, mailed Nov. 14, 2013.
Kawabata et al., The Content-Adaptive Pedestrian Navigation System and Usability in Practical Settings, Aug. 2005, Computers and Signal Processing.
Lyardet et al., CoINS Content Sensitive Indoor Navigation System, Dec. 11-13, 2006, Eighth IEEE International Symposium on Multimedia.
Japanese Office Action cited in JP Application No. 2009-188119, mailed Nov. 1, 2013.
Japanese Office Action cited in JP Application No. JP 2009-188119, mailed Sep. 19, 2013.
A Gradient Method for Realtime Robot Control, by Kurt Konolige, et al., www.cs.utexas.edu/users/pstone/Courses/395Tfall05/readings/Konolige-iros-00-gradient.pdf, Nov. 2, 2005.
Japanese Office Action for Japanese Application No. 2009-188115, mailed Apr. 30, 2013.
Japanese Office Action for Japanese Application No. 2009-188116, mailed Apr. 30, 2013.
Chinese Office Action in Chinese Application No. 200910165196.9, mailed Jul. 10, 2013.
Chinese Office action from Chinese Patent Application No. 200910165196.9, counterpart for related U.S. Appl. No. 12/179,635, filed Nov. 1, 2012, 3 pages.
Japanese Office Action cited in Japanese Application No. 2009-188116, mailed Nov. 13, 2013.
Lee. *3D Data Model for Representing Topological Relations of Urban Features*. Delaware County of Regional Planning Commission, pp. 1-15, referenced in 2008. http://gis.esri.com/library/userconf/proc01/professional/papers/pap565/p565.htm.
Rehrl, et al. *Combined Indoor/Outdoor Smartphone Navigation for Public Transport Travellers*. Austrian Research Centers, pp. 1-8, 2005. http://www.salzburgresearch.at/research/gfx/telecarto05_rehrl_final.pdf.
Walter, et al. *Shortest Path Analyses in Raster Maps for Pedestrian Navigation in Location Based Systems*. Stuttgart University, pp. 1-5, 2006. http://www.ifp.uni-stuttgart.de/publications/2006/walter06_ISPRS_CommIV_Goa.pdf.
European Search Report cited in EP09251456, mailed Apr. 14, 2014.

* cited by examiner

POSITIONING OPEN AREA MAPS

REFERENCE TO RELATED APPLICATIONS

The present patent application is related to the copending patent applications filed on the same date, Ser. No. 12/179,635, entitled "OPEN AREA MAPS," Ser. No. 12/179,668, entitled "COST BASED OPEN AREA MAPS," Ser. No. 12/179,676, entitled "OPEN AREA MAPS WITH RESTRICTION CONTENT," Ser. No. 12/179,680, entitled "END USER IMAGE OPEN AREA MAPS," Ser. No. 12/179,713, entitled "OPEN AREA MAPS WITH GUIDANCE," and Ser. No. 12/179,726, entitled "OPEN AREA MAPS BASED ON VECTOR GRAPHICS FORMAT IMAGES," the entire disclosures of which are incorporated by reference herein.

BACKGROUND OF THE INVENTION

The present invention relates to navigation and, more particularly, to open area maps that may be used for routing.

As the world population increases, more and more infrastructure, buildings, exterior and interior development, and other features to support human growth are being generated. Also, existing, infrastructure, buildings, parks, and other environments are being adapted to accommodate more people and traffic. The increase and adaptation of environments impacts travel and how people go from one place to another.

Navigation systems and/or devices are used to aid travel. For example, vehicle navigation devices may assist a person driving on a road network. Such devices may provide routing and guidance to a desired destination based on existing roads or pathways.

However, there are areas in which people move about that do not have set roads, tracks, or paths or in which such paths are not needed to travel from one point to another within the area. For example, floors of a building, parks, or other exterior or interior areas are treaded upon on a daily basis. People are able to move about in such areas in any number of patterns to get from one place to another. However, some movement or patterns of movement in these areas may be inefficient or unnecessary based on confusion, lack of knowledge of the layout of an area, or other factors. Also, a person may not know how to get from one point to a desired destination in such areas as well as external areas.

SUMMARY OF THE INVENTION

According to one aspect, a method of placing an open area map is provided. For example, coordinates associated with an open area map are translated into real-world coordinates. The open area map is positioned within a geographic map as a function of the real-world coordinates. The geographic map represents a real-world area around the open area map. The open area map includes an image of a layout representing a pedestrian walkable area, and the open area map is configured to provide point-to-point routing within the layout.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
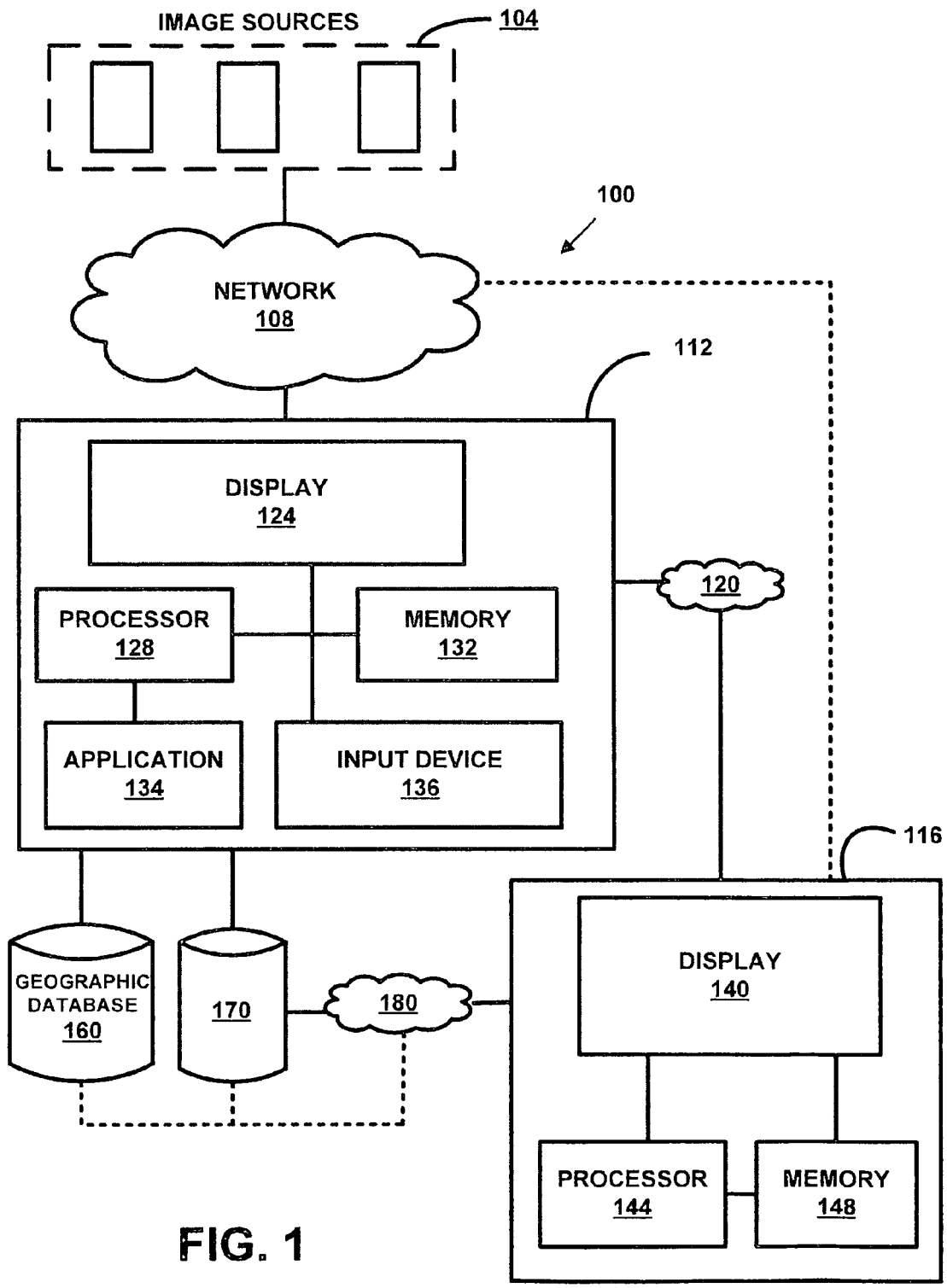
FIG. 1 is a diagram of a system for generating an open area map.

FIG. 1 shows one embodiment of a system 100 used for generating one or more open area maps. The system 100 includes, but is not limited to, an image source or sources 104, a network 108, a geographic database 160, a device 112, a network or connection 120, a database 170, a network 180, and a user device 116. Additional, fewer, or different components may be provided. For example, a proxy server, a name server, a map server, a cache server or cache network, a router, a switch or intelligent switch, a geographic database, additional computers or workstations, administrative components, such as an administrative workstation, a gateway device, a backbone, ports, network connections, and network interfaces may be provided. While the components in FIG. 1 are shown as separate from one another, one or more of these components may be combined.

The image source 104 is a website, an application, a program, a workstation or computer, a file, a memory, a server, a beacon or map beacon, a depository, and/or any other hardware and/or software component or database that can store or include images or data associated with images. Alternatively, the image source 104 is one or more images.

In one embodiment, the image source 104 includes one or more images of a layout. The images are raster or pixel based images, such as a JPEG, Bitmap, Pixmap, Tiff, or other pixel or raster based file format. The images may be raster or pixilated scanned copies of paper or hard layouts. Alternatively, the images may be vector based or vectorized images. Layouts may correspond to real-world areas in which a person, pedestrian, or people walk and/or move about. The layouts may also correspond to future real-world areas that have not been built yet. Alternatively, the layouts may correspond to imaginary locales, settings, or areas.

The layouts may represent an unorganized or unconstrained geographic area. For example, the layout is an area in which a pedestrian is not limited to travel only on a set road or path network. Rather, the pedestrian may walk through public plazas, parks, buildings, corridors, lobbies, or hallways having no associated road or path network or pattern. Additionally, the pedestrian does not have direction restrictions as a vehicle on a road. Moreover, the pedestrian has a greater degree of freedom of motion in the layout and may chose from a plethora of self-determined paths in any given open area.

The images of the layouts may include images of a real-world building floor plan, a parking lot, a park, an indoor or outdoor recreation area, and/or other interior and exterior area plans corresponding to places where a person can walk or move (e.g., via a wheel chair, a bicycle, or other mobile assistance device). The images are pre-existing or publicly available images. For example, the images are originally formed or created for purposes other than generating a routable map. The pre-existing images may be generated by an entity separate from a developer of a routable open area map and/or its end user. The pre-existing images are available to the public or an entity for free or for a purchase price (e.g., online). Alternatively, self-generated images, images originally generated for creating a routable map, or non-public images may be used.

The image source 104 is in communication with the device 112 via the network 108. The network is the Internet, an intranet, a local area network ("LAN"), a wide area network ("WAN"), a virtual private network ("VPN"), a local wireless or wired connection (e.g., a USB connection or other device connection), and/or any known or future network or connection.

The device 112 receives images of layouts from the image source 104 for generating routable open area maps. The device 112 is a workstation, computer, editing device, beacon or map beacon, and/or other computing or transmitting device. For example, the device 112 is an editing workstation. The device 112 includes, but is not limited to, a display 124, a processor 128, a memory 132, an application 134, and an input device 136. Additional, fewer, or different components may be provided. Audio components may be provided. For example, a speaker, audio jacks, and/or other components for outputting or receiving audible or sound signals are provided.

The display 124 is any mechanical and/or electronic display positioned for accessible viewing in, on, or in communication with the device 112. For example, the display 124 is a touch screen, liquid crystal display ("LCD"), cathode ray tube ("CRT") display, or a plasma display. The display 124 is operable to display images, such as images of layouts, floor plans, maps, or other areas. The input device 136 is a button, keypad, keyboard, mouse, trackball, rocker switch, touch pad, voice recognition circuit, or other device or component for controlling or inputting data in the device 112. The input device 136 may be used to perform functions, such as modifying received images (e.g., adding doors or openings) or using eraser tools.

The processor 128 is in communication with the memory 132, the application 134, the display 124, and the input device 136. The processor 128 may be in communication with more or fewer components. The processor 128 is a general processor, application-specific integrated circuit ("ASIC"), digital signal processor, field programmable gate array ("FPGA"), digital circuit, analog circuit, or combinations thereof. The processor 128 is one or more processors operable to control and/or communicate with the various electronics and logic of the device 112. The processor 128, the memory 132, and other circuitry may be part of an integrated circuit.

The memory 132 is any known or future storage device. The memory 132 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 132 may be part of the processor 128. The memory 132 is operable or configured to store images of layouts received by the image source 104. The memory 132 may also store images or data generated by the processor 128.

The processor 128 is operable or configured to execute the application 134. The application 134 is a software program used to generate open area maps that are routable based on pre-existing images, such as the images received from the image source 104. For example, the processor 128 runs the application 134 and creates or generates or assists in generation of a routable map via input from the input device 136 and/or automated commands. The application 134 may be stored in the memory 132 and/or other memory.

The device 112 is operable or configured to send or transmit one or more generated routable open area maps to the user device 116, or the user device 116 may request a routable open area map via a network or connection 120. The connection 120 is the Internet, an intranet, a local area network ("LAN"), a wide area network ("WAN"), a virtual private network ("VPN"), a local wireless or wired connection (e.g., a USB connection or other device connection), and/or any known or future network or connection.

Alternatively, the device 112 may store, upload, or send one or more generated routable open area maps or data thereof to the database 170. The database 170 may be a database, a memory, a website, a server, a beacon, or other device used for storing, receiving, and/or transmitting data corresponding to the routable open area maps. For example, the database 170 may store data entities that represent different layers of the open area map, such as data corresponding to reference regions, cost, restrictions, a grid or array, image data, and/or other content. The user device 116 may obtain a routable open area map or data thereof from the database 170 via the network 180, such as without communicating with the device 112. The network 180 is the Internet, an intranet, a local area network ("LAN"), a wide area network ("WAN"), a virtual private network ("VPN"), a local wireless or wired connection (e.g., a USB connection or other device connection), and/or any known or future network or connection. Alternatively, data of the open area maps may be stored in the database 160 in which the database 160 may perform functions similar to the database 170. Features and components of the databases 160 and 170 may be mixed and matched.

Also, routable open area maps may be "pushed" onto the user device 116. For example, beacons, map beacons, or other devices can transmit or send routable open area maps or related content to the user device 116 based on the location or position of the user device 116. In one embodiment, a beacon can be placed at an entrance or passageway of a building or other area, and once the user device 116 comes within a certain range of the beacon, a routable open area map associated with the area and/or other related areas is sent to the user device 116.

The user device 116 is used to operate one or more routable maps to allow a user to navigate in or on respective layouts or areas. The user device 116 is a cellular telephone, a mobile phone, a personal digital assistant ("PDA"), a watch, a personal navigation device ("PND"), a computer, a digital floor plan device, a portable or non-portable navigation device, a kiosk, and/or other fixed, removable, or transportable digital device. The user device 116 includes, but is not limited to, a display 140, a processor 144, and a memory 148. Additional, fewer, or different components may be provided. For example, audio and/or application components may be provided. The display 140, the processor 144, and the memory 148 may be similar to or different than the display 124, the processor 128, and the memory 132, respectively.

The geographic database 160 may be in communication with the device 112, the user device 116, the database 170, or other devices or components via the 180 or other network or connection. The geographic database 160 may be a master version, a copy version, or a source version. The geographic database 160 contains data (also referred to as "geographic data" or "spatial data") that represent geographic features in a coverage area. The coverage area may correspond to an entire country, such as the United States. Alternatively, the coverage area may correspond to several countries, such as the United States, Canada, and Mexico, or France, Germany, and Italy, and so on. According to another alternative, the coverage area of the geographic database 160 may represent only a single region within a country, such as the West Coast or the Midwest of the U.S. or a city, town, or portions thereof. Although the geographic database 160 includes data that represent geographic features in the entire coverage area, there may be parts of the coverage area that contain geographic features that are not represented by data in the geographic database, or for which the representation of geographic features is sparse.

In one embodiment, the geographic database 160 includes data or attributes about a road network located in the coverage area. The data about the road network include various kinds of information, such as the geographic coordinates of positions of the roads, street names of the roads, address ranges along the roads, turn restrictions at intersections of roads, and other vehicle navigation attributes. The geographic database 160 also includes data about points of interest in the covered area. Points of interest may include hotels, restaurants, museums, stadiums, offices, automobile dealerships, auto repair shops, etc. The geographic database 160 may include data about the locations of these points of interests. The geographic database 160 may also include data about places, such as cities, towns, or other communities, and other geographic features, such as bodies of water, mountain ranges, etc. The geographic database 160 may include other kinds of information. For example, instead of or in addition to including data about a road network and related vehicle navigation features, the geographic database 160 may also include pedestrian attributes or data used for pedestrian navigation. Pedestrian attributes may include trail, sidewalk, or path data as well as sign, address, or other information related to pedestrian travel. Alternatively, a separate database for pedestrian information or navigation may be provided.

There are different ways to collect data for the geographic database 160, such as by a map developer or geographic database developer. These ways include obtaining data from other sources, such as municipalities. In addition, the geographic database developer may employ field personnel to travel by vehicle along roads throughout the geographic region to observe features and record information about them (e.g., using GPS tracking or geo-coding to model road patterns). Field personnel may also walk around or use devices that are able to move about pedestrian areas (e.g., a Segway device) to collect geographic data or attributes. The data collected by the geographic database developer are stored in the geographic database 160. The geographic database 160 is stored in a format that facilitates updating, maintenance, and development. For example, the geographic database 160 or data in the geographic database 160 is in an Oracle spatial format, such as for development or production purposes. Alternatively, the Oracle spatial format or development/production database may be compiled into a delivery format, such as a GDF format. The delivery format is used to provide data to product companies, such as companies that make PND's or other navigation devices or systems. The production format (such as Oracle spatial format) and the delivery format may not be in a format suitable for performing navigation-related functions. The data in the production and/or delivery formats may be compiled or further compiled (such as into a PSF format) to organize and/or configure the data for performing navigation-related functions, such as route calculation, route guidance, map display, speed calculation, distance and travel time functions, and other functions. The navigation-related functions may correspond to vehicle and/or pedestrian navigation.

In another embodiment, the geographic database 160 may be a database, memory, and/or server with spatially registered imagery. For example, real-world coordinates, images, and/or content representing the real-world or real-world area may be stored or organized without corresponding to or being associated with navigation or routing and/or attributes or functions thereof.

In one embodiment, a user, such as a person working on a building floor, may want to be able to route or navigate about his or her building floor. Accordingly, an image of the layout or floor plan of the user's floor, which is stored in the image source 104, is transmitted and received at the device 112. Another entity, such as a map developer, operates the device 112. The map developer may be a person, company, or entity that develops maps for navigation or obtains and maintains map data and/or a geographic database, such as NAVTEQ North America, LLC located in Chicago, Ill. The map developer views the pre-existing image of the layout on the display 124 and generates a routable map based on the pre-existing image via the input device 136 and the software application 134. Automated commands and/or processes may be used in development of the routable open area map. Alternatively, the creation or generation of the routable open area map may be substantially entirely automated. The user may download or receive the routable map of his or her floor on the user device 116. For example, the user uses the user device 116 to download the routable map from the device 112 or a storage site or component associated with the device 112 (e.g., via the connection 120, such as a USB connection, a wireless connection, or other connection). Alternatively, the user may download the routable map on a device (e.g., a computer or a jump/thumb drive) different than the user device 116 and then transfer the data associated with the routable map to the user device 116 or other user device. The user then uses the device 116 to display the routable map for routing, guidance, and/or navigation purposes regarding the building floor. The routable map may also be incorporated or associated with data in the geographic database 160. For example, the routable map is linked to other geographic data, such as a geographic map of a certain region, based on real-world coordinates and/or other content such as road segment or node data or other road network data. The end user may view the routable map within a larger geographic map for display and/or routing purposes, such as via the device 116 or other device.

Figure 2:
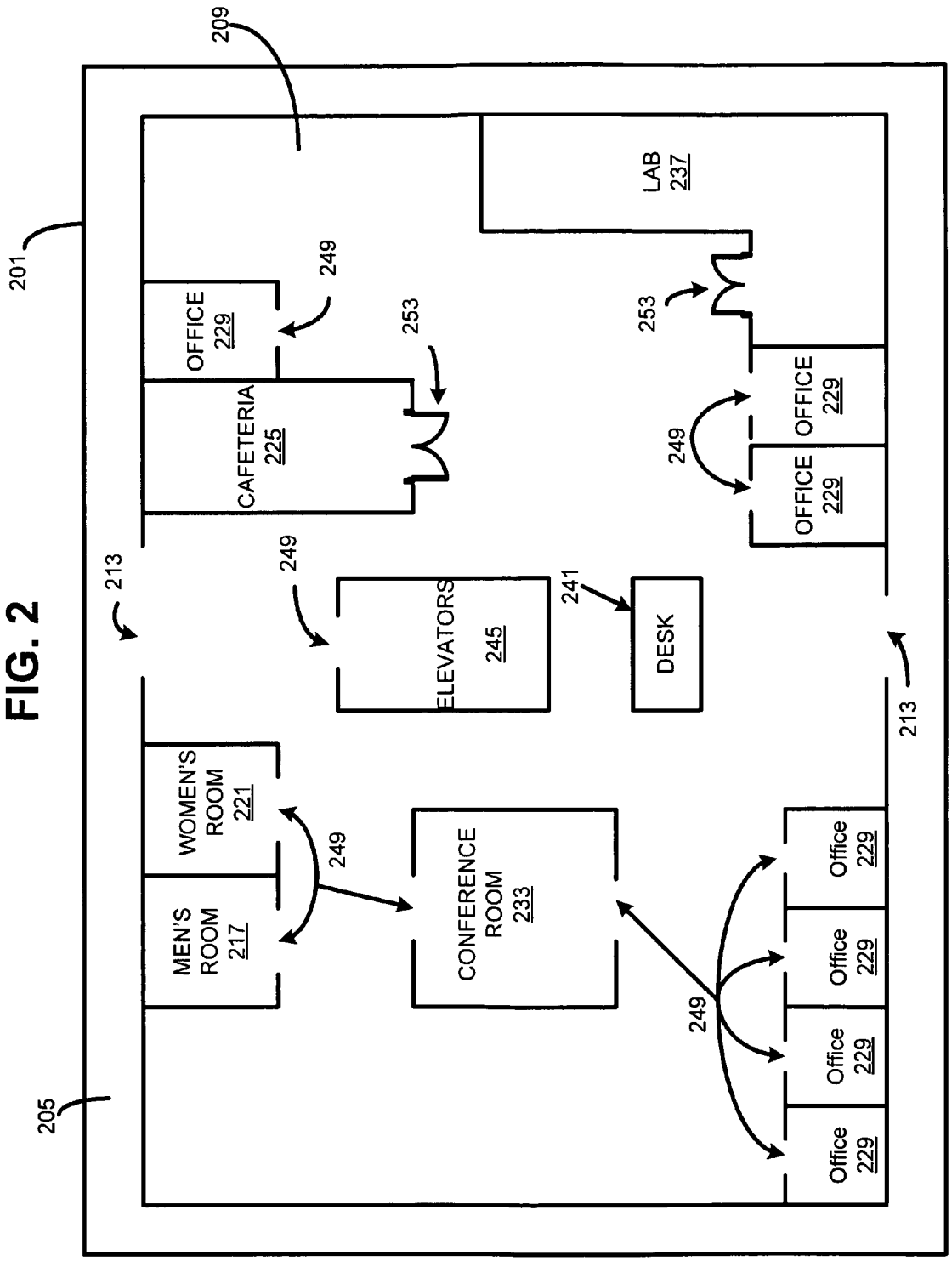
FIG. 2 is an image of a layout used in the system of FIG. 1.

FIG. 2 is one embodiment of an image 201 of a layout used in the system 100. The image 201 is a pre-existing or publicly available image (e.g., is associated with the image source 104 or other source) that can be downloaded from the Internet or other network. For example, the image 201 may be downloaded, received, obtained from a website or other source. The image 201 represents a real-world layout or floor plan of a building floor, such as a first floor or other floor. The image 201 includes graphical representations or icons of areas, spaces, and/or designations in the layout. For example, the image 201 includes image reference objects, such as a men's room 217, a women's room 221, a cafeteria 225, offices 229, a conference room 233, a lab 237, a desk 241, and elevators or elevator bank 245. Image representations of doors 249 are also provided. The doors 249 are shown as a gap or opening in respective image reference objects. Alternatively, a door may be represented using a door symbol or image object 253 rather than an opening. Or, there may not be a representation of a door or opening.

The image 201 also includes an image representation of an open space, a walking grounds, a common or public area, and/or a hall area 209 for people to walk or move about to get from one place to another on the floor. Walls or barriers are depicted by corresponding, associated, or contiguous pixels or lines (e.g., a heavy line) of substantially the same or similar color. Entrances and/or exits 213 are depicted as openings or gaps in the walls or barriers that allow access between the interior area 209 and an exterior area 205. The exterior area 205 may represent an outer hallway, an outside of the building (e.g., a sidewalk, street, or road), or other exterior environment. The exterior area 205 or a portion or point thereof may be linked to or correspond to a real-world geographic map or database. The real-world geographic map or data may be used to perform navigation related functions, such as route calculation for vehicles and/or pedestrians.

Figure 3:
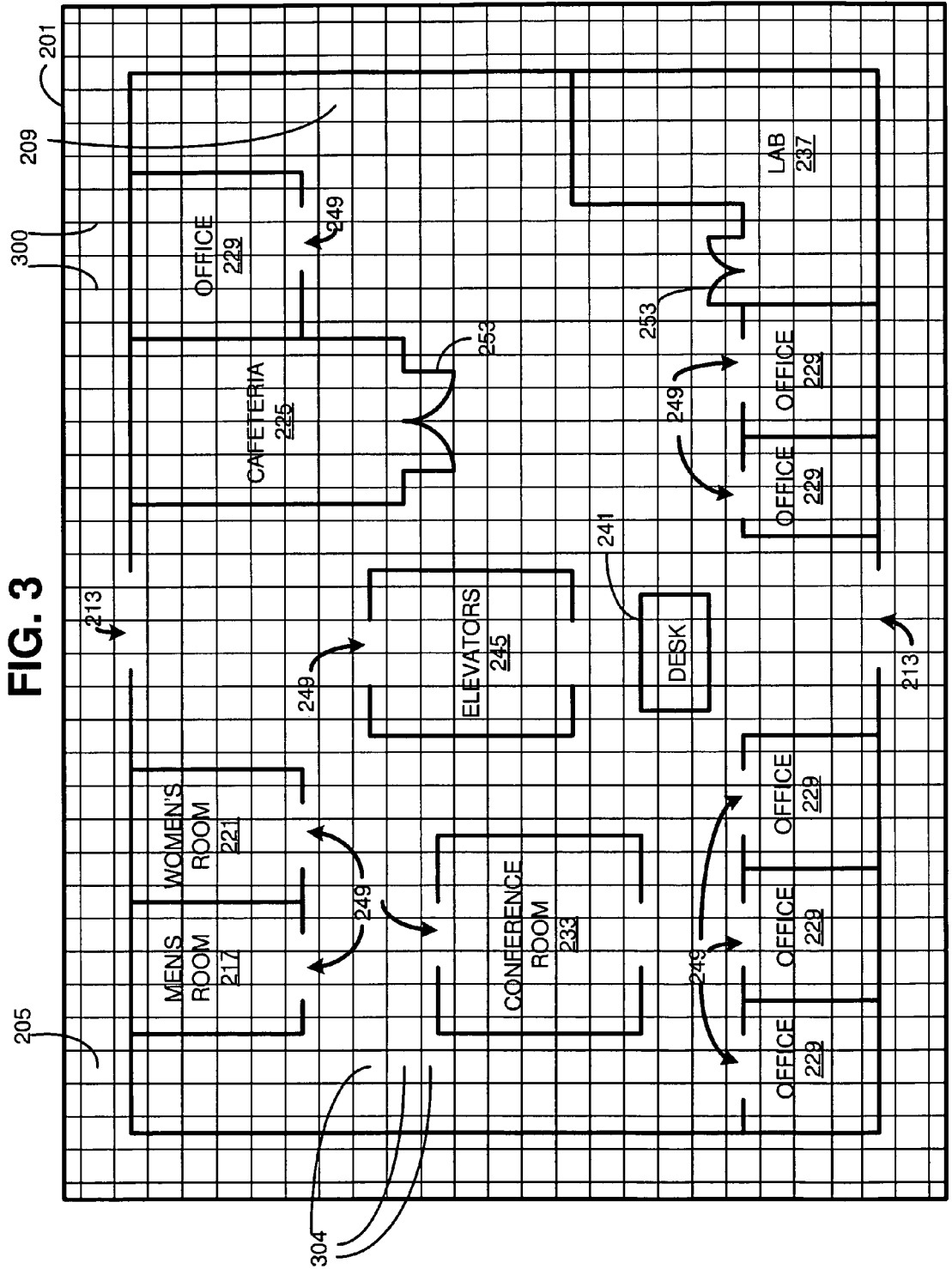
FIG. 3 is an image corresponding to a process used in the system of FIG. 1.

FIG. 3 is one embodiment of the image 201 corresponding to or undergoing a process used in the system 100 of FIG. 1. For example, the image 201 is downloaded or received at the device 112. The image 201 is used to create or generate an open area map that is routable. For example, a grid, mesh, or array 300 is applied on or over the image 201 or a copy of the image 201. The grid, mesh, or array 300 may be a grid or array of geometric shapes (e.g., uniform sized geometric shapes), such as tiles, sections, blocks, points, dots, circles, polygons, or other shapes. The grid or mesh 300 covers an entire ground area of the image 201. A ground area refers to a surface, plane, or floor or a portion thereof that can be walked upon as well as the surface in which objects or barriers may be placed or positioned on or over.

The grid or mesh 300 includes areas, sections, blocks, or tiles 304. Alternatively, the grid, mesh, or array 300 may include unconnected dots or points corresponding to areas or sections similar to the tiles 304 (e.g., the dots or points replace or act as a substitute for the tiles 304). The tiles 304 have a substantially rectangular or square shape and are substantially uniform in size. Alternatively, the tiles 304 may have a circular, triangular, or other geometric or polygon shape, and the tiles 304 may be different sizes at different locations rather than being uniform.

The grid 300 may be applied over certain areas of the layout rather than the entire image or entire ground area. For example, the grid 300 may be applied only in hallway areas, such as the interior area 209. In such as case, the grid 300 has a shape that corresponds to a pedestrian-accessible contiguous sub-area within the real-world area in which the shape has a boundary that corresponds to the walls in the pre-existing image. The grid 300 or portions thereof may also be applied to areas designated within an image reference object (e.g., the inner area of a room). Also, tiles may automatically fill into contiguous open areas. For example, a hallway or corridor area may be selected to automatically fill the area with tiles or sections of a grid or mesh.

The tiles 304 may be assigned or designated coordinates, such as local or global map coordinates. For example, each center of a tile 304 or other part of the tile is given a (x,y), latitude and longitude, or other coordinate designation. One of the tiles 304, such as at a corner of the image, may be designated as an origin point (0,0) for reference and positioning purposes. The coordinates allows items, features, or regions to be searchable. However, for routing purposes, the coordinates may not be used.

Figure 4:
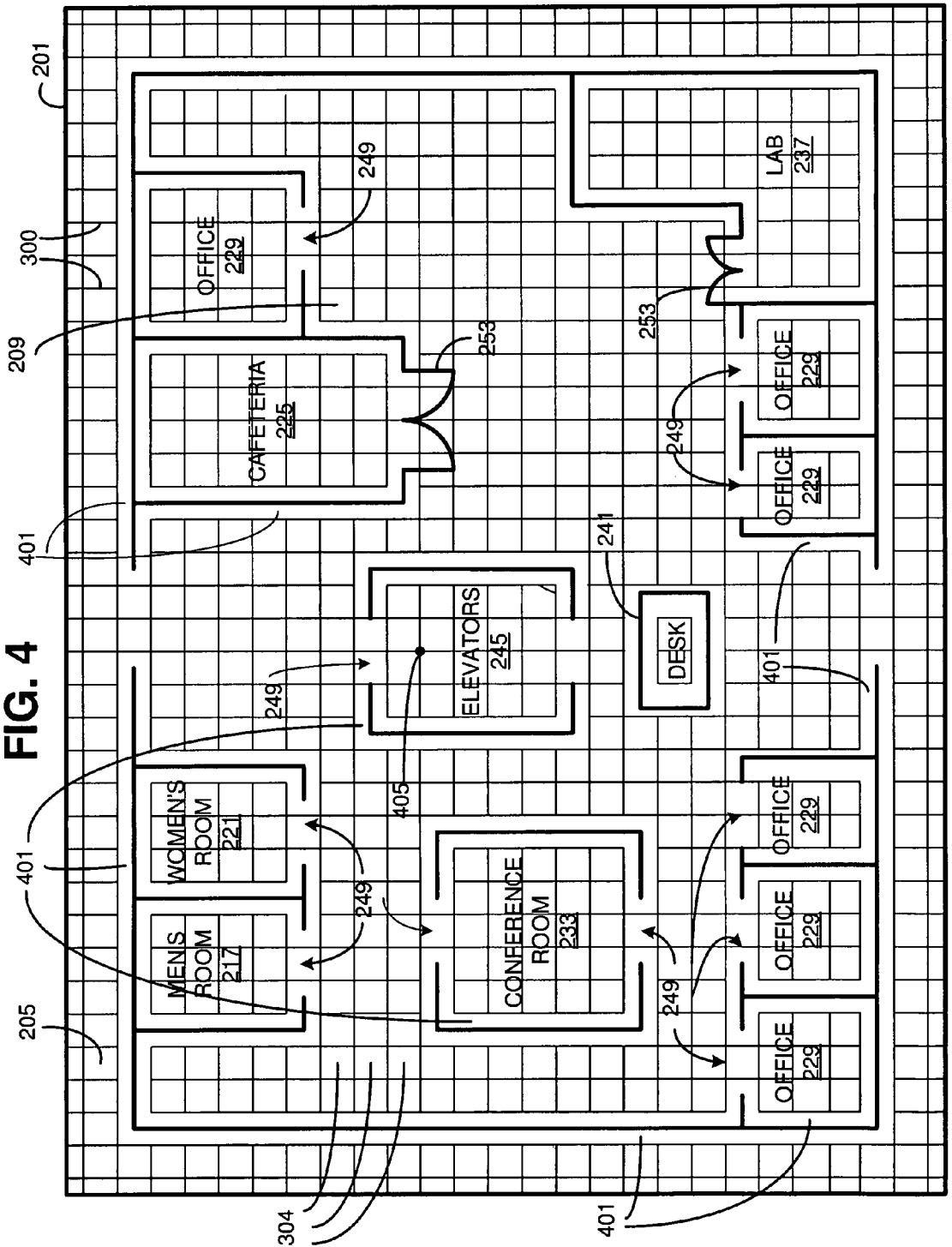
FIG. 4 is another image corresponding to another process used in the system of FIG. 1.

FIG. 4 is one embodiment of the image 201 corresponding to or undergoing another step or process after the mesh 300 has been overlaid. Tiles that are not to be walked on or that are non-navigable are provided as tiles or area 401 (e.g., the tiles or area 401 may be replaced with unconnected dots or points that represent non-navigable areas). For example, tiles surrounding or under or associated with borders or walls of the image reference objects (e.g., reference objects 217, 221, 225, 229, 233, 237, 241, and 245) are selected to be or are designated as non-navigable tiles 401. Also, the image representation of the border, barrier or wall between the interior hall area 209 and the exterior area 205 is associated with the non-navigable tiles 401 for routing purposes. The tiles 401 allow routes to be prohibited from passing through walls or barriers to represent a real-world experience. However, doors 249 and 253 are associated with navigable tiles 304 to allow routing in and out of rooms or areas surrounded by tiles 401. Alternatively, if no doors or openings are present or created, tiles substantially adjacent or proximate to reference areas may be used for routing to and from respective reference areas.

The non-navigable tiles 401 may be or represent tiles (or dots or points) removed from the grid 300 or may be tiles (or dots or points) designated with a non-navigable status. The non-navigable tiles 401 or the lack thereof may be represented as blank spaces, in which spaces that are free of the grid or tiles are not navigable for routing purposes. Alternatively, the non-navigable tiles 401 may be colored differently than the navigable tiles 304.

Navigable or non-navigable tiles, dots, or points may be sub-classified. For example, each or some tiles may be associated with a feature or location related to the layout. In one embodiment, tiles may be linked or correspond to a washroom area, a narrow area, a windowed area, a dimly lit area, a high traffic area, a low traffic area, or other area or feature. By classifying or sub-classifying the tiles, one can input preferences for routing purposes. For example, a user may want to avoid high traffic areas, and, accordingly, the user may input his or her preference before or during routing.

A wrap or boundary feature may be used regarding the grid 300. In certain cases, a person may want to route from one point in the interior area 209 to another point in the interior area 209, but a path is generated that routes the person out into the exterior area 205 and back into the area 209. Such routes may occur when it is optimum to route outside and back inside (e.g., when having multiple openings between interior and exterior areas). However, to avoid any routing to tiles in the exterior area 205, a wrap or boundary feature may be used that bounds all routing within the area 209 and associated areas. For example, a boundary line or designation may be allocated along the circumference of the inner area. However, the boundary feature will allow routing to the exterior area 205 when a user selects a destination point to be in the exterior area 205 or outside an inner area. Alternatively, the tiles of the exterior area 205 may be designated as non-navigable, or openings to the exterior area 205 may be associated with non-navigable tiles 401.

A connection point 405 is also provided. The connection point 405 may be generated or provided in a spatial or data layer separate from the grid or mesh 300. The connection point 405 is represented as a tile 304 or a subset of tiles 304 within an area. The connection point 405 may encompass the entire area of the elevators 245 or a portion thereof. Alternatively, the connection point 405 may not be associated with a reference image object or reference region. The connection point 405 represents or acts as a link to another map, such an open area map that is routable, for routing and navigation purposes. For example, the connection point 405 may correspond to one or more elevators, a stairwell, an escalator, a ladder, or other feature for moving a person to another floor or area. A plurality of connection points 405 may correspond to respective individual elevators or features. In one embodiment, the connection point 405 is used to route between an area or point from the image 201 to another point or area on another map or floor plan, such as another map or floor plan representing another floor of the building (e.g., a second floor, a third floor, or Nth floor). Alternatively, the connection point 405 may represent a connection for moving or transferring a person from one point to another point on the same floor or ground area. For example, the connection point 405 may correspond to a moving walkway or other transportation device. Also, the connection point 405 may represent a connection to another routable open area map associated with the same level or area. For example, in one open area map, a route may be generated to an area that is represented by a blank, unspecific, or general polygon or shape that represents a reference area, such as a food court. A connection point can be placed at, by, or on the general polygon that represents the reference area in which the connection point corresponds to or directs one to another routable open area map that has detailed features and/or reference regions within the original reference area (e.g., the food court).

Figure 5:
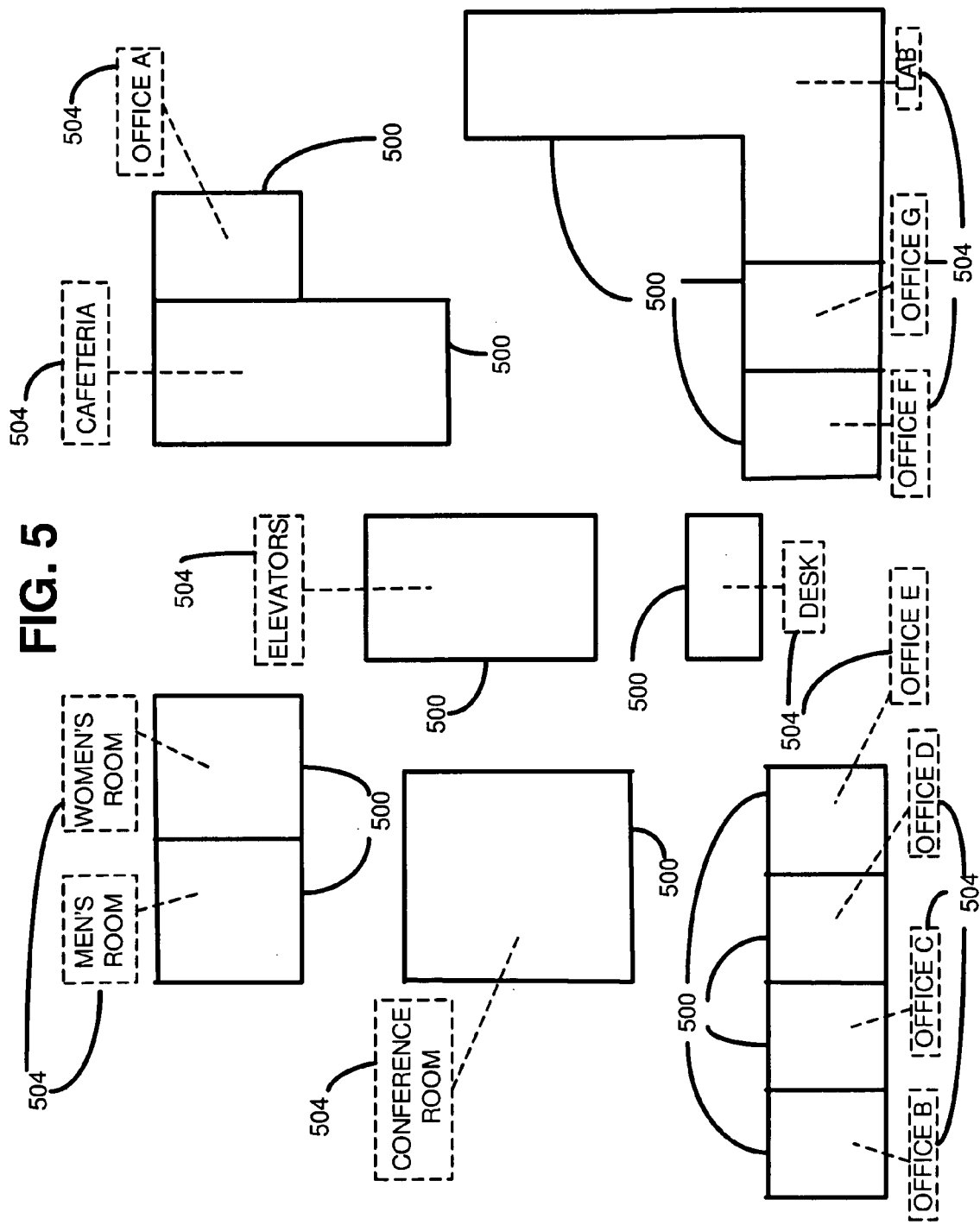
FIG. 5 is a diagram illustrating reference regions corresponding to the image of FIG. 2.

FIG. 5 is a diagram showing reference regions 500 corresponding to the image 201. In a spatial layer separate from the grid 300, the reference regions 500 are generated. For example, the image reference objects 217, 221, 225, 229, 233, 237, 241, and 245 in the image 201 are part of a raster image or a pixilated image. The raster image may be binarized (e.g., converting pixels to black and white pixels and/or 1's and 0's). The device 112 extracts names or descriptions associated with the image reference objects. The separation allows for facilitation of optical character recognition ("OCR") to generate text 504 corresponding to the names or descriptions associated with the raster image 201. The text 504 is used for searching or associating different areas of an open area map. The text 504 may match the names or descriptions of the image 201. Alternatively, additional or different text or information may be added. For example, text "A," "B," "C," "D," "E," "F," and "G" are added to the "office" text for differentiation purposes. The added text may or may not be visible to an end user.

After graphics-text separation, the image reference objects go through vectorization to form the polygons, reference regions, or areas 500. The reference regions 500 correspond to the different areas, rooms, or spaces in the image 201. The reference regions 500 are associated with or correspond to respective navigable tiles 304 and respective non-navigable tiles 401 represented by the grid 300 on a different spatial layer.

The grid or mesh layer may be compiled with the reference region layer, a connection layer, and/or other spatial or data layers, such as a cost layer or restriction layer, to form or generate an open area map that can be used for navigation and/or routing.

Figure 6:
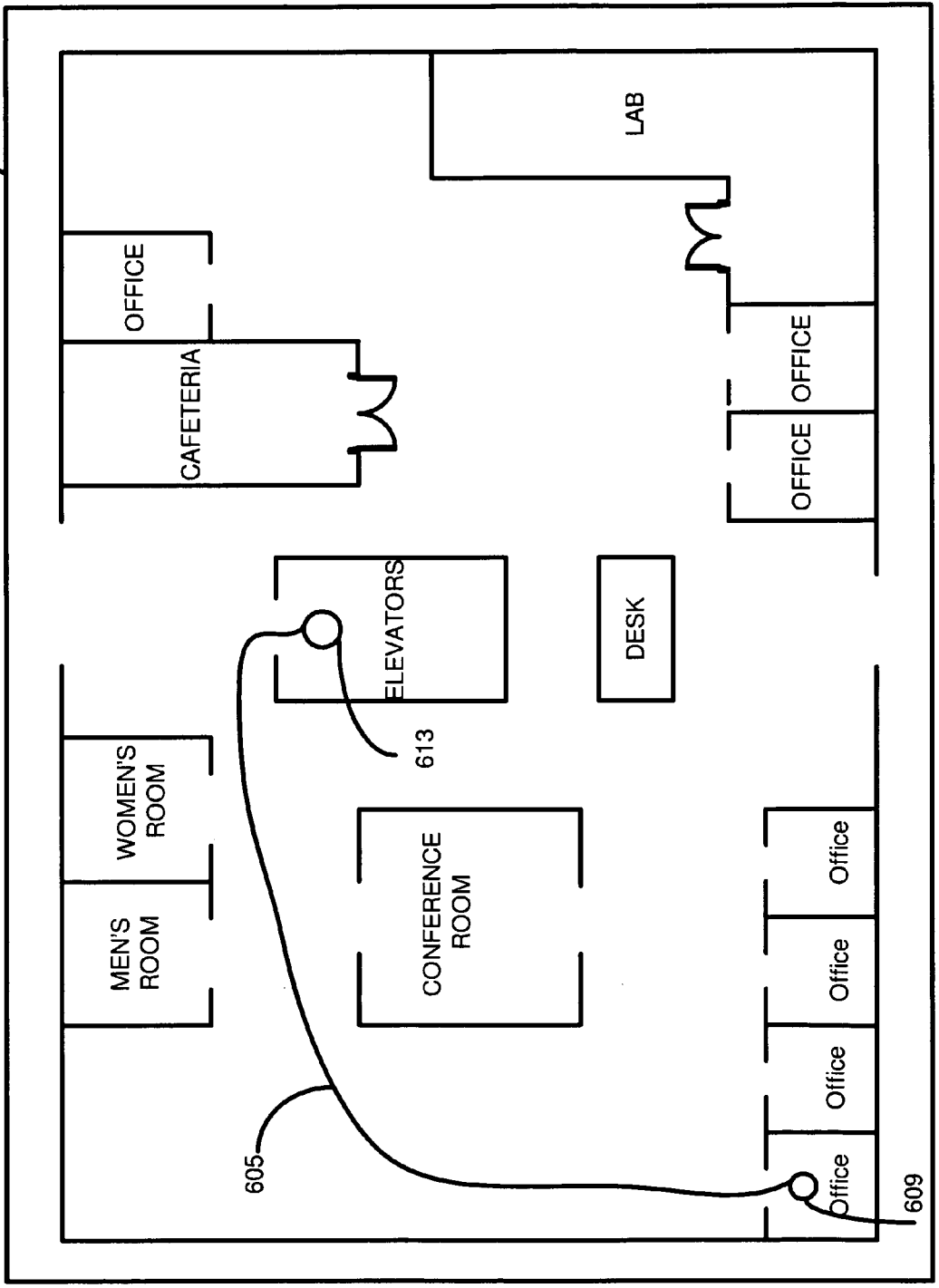
FIG. 6 is an image of an open area map generated by the system of FIG. 1.

FIG. 6 shows one embodiment of an open area map 601 generated by the system 100 of FIG. 1. The open area map 601 may be displayed on the display 140 of the user device 116 or other display. The open area map 601 includes graphical representations of the reference image objects of the image 201. For example, the image 201 is used as a background or base image for the open area map 601. Alternatively, different graphics or images are generated (e.g., based on the generation of the reference regions 500) to represent the original layout of the image 201. The grid 300, including the navigable tiles 304 and the non-navigable tiles 401 or lack thereof, compiled with the reference regions 500 and the connection point 405 underlie the open area map 601 for routing and navigation purposes. For example, the grid 300 or compiled grid may not be seen by a user. Alternatively, the grid 300 and/or other features may be exposed to the user.

Figure 7:
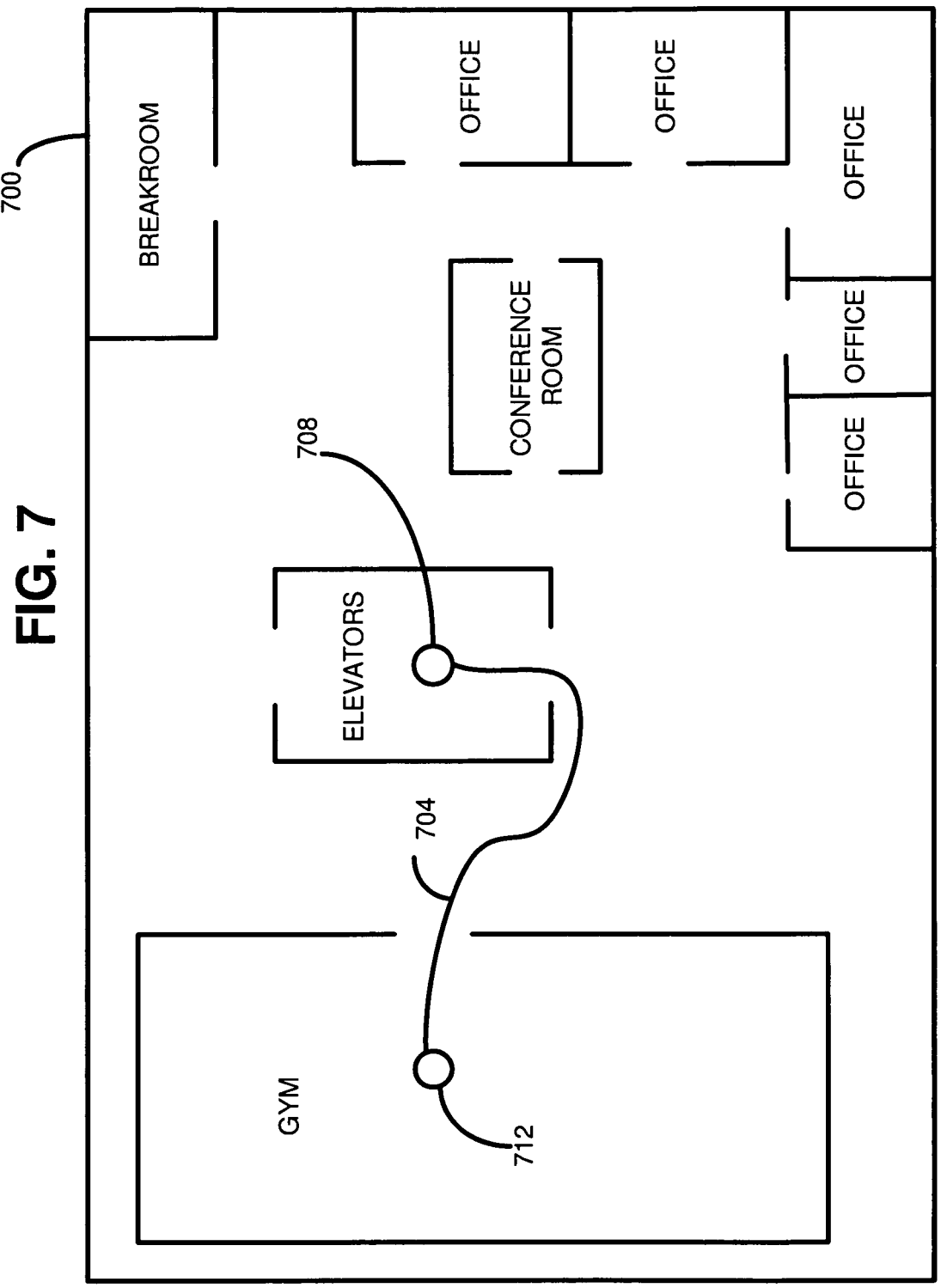
FIG. 7 is another image of another open area map generated by the system of FIG. 1.

FIG. 7 shows one embodiment of an open area map 700 generated by the system 100 of FIG. 1. The open area map 700 represents another floor of the building that includes the floor represented by the open area map 601. The open area map 700 includes image reference objects, such as a breakroom, a conference room, elevators or elevator bank, offices, and a gym, as well as associated reference regions, a grid, a connection point 708, and navigable and non-navigable tiles similar to the respective features of the open area map 601 discussed above.

In one embodiment, a user may want to use the open area maps 601 and 700 to route from an office on one floor to the gym on another floor of the building. Referring to FIG. 6, the user searches for the office, using a text search, to designate an origin point 609. The text for the particular office is associated with the respective reference region 500, which is associated with respective tiles 304 and 401. Alternatively, the user physically touches or selects the origin point 609 on the display. Or, the origin point is determined based on a global positioning satellite ("GPS") system or device, an indoor location system (e.g., WiFi based), or the fact that the location of the origin point is fixed (e.g., a kiosk or a floor plan device on a wall). The origin point 609 may correspond to one or more tiles within or associated with the reference region or reference image object of the office or may correspond to the entire area. Referring to FIG. 7, the user then searches for the gym, using a text search, to designate a destination point 712. The text for the gym is associated with the respective reference region for the gym, which is associated with respective tiles. Alternatively, the user physically touches or selects the destination point 712 on the display. The user may switch to the open area map 700 or may view both open area maps 601 and 700 on the same screen or window.

After the origin point 609 and destination point 712 are selected, various routes are calculated and/or compared based on the underlying compiled grid. The routes may be calculated based on a Dijkstra method, an A-star algorithm or search, and/or other route exploration or calculation algorithms. Various aspects, such as distance, non-navigable areas, costs, and/or restrictions, are considered to determine an optimum route. A path 605 (FIG. 6) is generated based on the calculation. The path 605 is displayed for the user to view and follow. The path 605 shows a path that starts from the origin point 609 in the office, passes the conference room, and uses the elevators via a connection point 613, such as the connection 405. Then the open area map 700 shows a path 704 (FIG. 7) that starts from elevators at a connection point 708 and leads to the gym at the destination point 712.

The calculation and determination of the routes and/or the paths 605 and 704 are based on or formed of adjacent, continuous, or connected tiles. For example, navigable tiles that border or touch each other are considered for point-to-point routing, in which any area in the layout or any point associated with adjacent tiles can be routed to based on calculation regarding the grid or mesh (i.e., not solely pre-determined routes). Adjacent tiles forming a route may be connected or linked by their center points or other parts.

Figure 8:
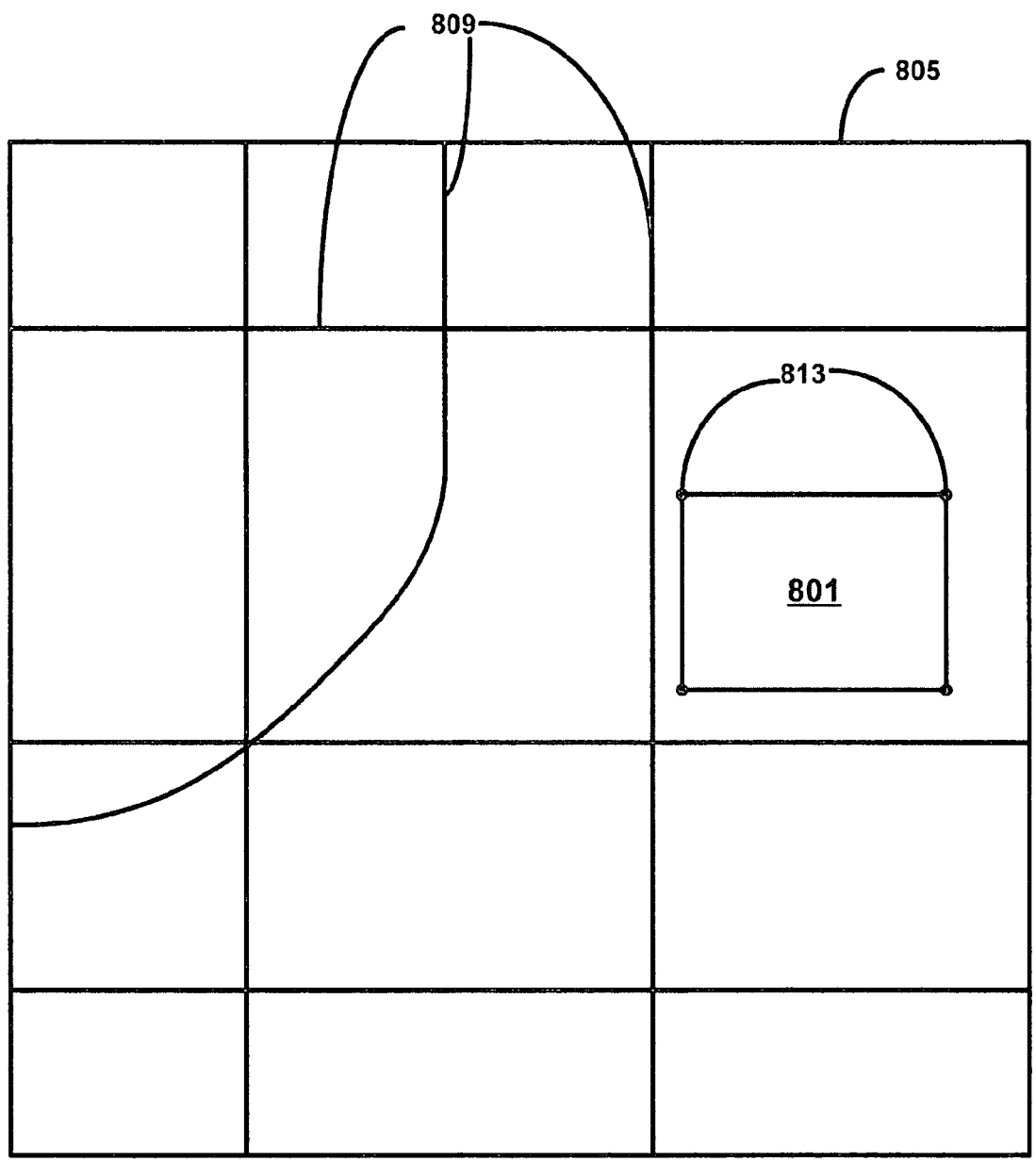
FIG. 8 is a diagram showing an open area map positioned in a geographic map.

FIG. 8 is a diagram showing an open area map 801 positioned in, on, or over a geographic map or database 805. The open area map 801 is a routable open area map, such as the open area map 601 and/or 700. The geographic map 805 is geographic data corresponding to a region, such as data in the geographic database 160. Also, the geographic map 805 may represent compiled data that corresponds to a database or map configured for vehicle and/or pedestrian navigation. Alternatively, the geographic map 805 may correspond to any real-world or geographic map or data that may or may not be used for navigation or routing. The geographic map 805 includes, but is not limited to, a road network 809. The road network 809 represents real-world roads or paths, such as in a city or other geographic region. Navigation attributes and points of interest ("POI's") may also be provided.

The open area map 801 is associated or linked with the geographic map or data 805. For example, one or more points or coordinates of the open area map 801 are aligned or positioned in or with one or more points or coordinates of the geographic map or data 805. In one embodiment, coordinates corresponding to tiles, objects, or other portion of the open area map 801 are in, translated to, or converted to real-world coordinates 813, such as longitude or latitude, Universal Transverse Mercator ("UTM") coordinates, or other rectangular or 3D coordinates, such as altitude or elevation points. Based on the real-world coordinates 813, the open area map 801 or data thereof is placed, positioned, or aligned with or within the geographic map 805. For example, nodes, segments, or other features of the geographic map 805 may correspond to real world coordinates, such as longitude, latitude, and/or UTM coordinates as well as elevation or altitude information. Accordingly, by knowing the real-world coordinates 813 of the open area map 801, the open area map 801 may be accurately linked to a real-world position or location in the geographic map 805 (such as in the geographic database 160 and/or a visual display). Also, the coordinates or points of the open area map or data thereof may be linked or associated with a road network, such as road segments, nodes, other features, without reference to real-world coordinates An end user may perform point-to-point routing using the open area map 801 while viewing the surrounding geographic area or map 805. Also, the open area map 801 may be linked to the geographic map 805 for navigation or routing purposes, such as via a point or navigation data. For example, an end user may want to navigate or route from inside the open area map 801 to a point external to the open area map 801 that is covered in the geographic map 805, or vice versa. Accordingly, a route may be calculated and/or displayed in the open area map 801, and then from a transition point or area, the route or second route (a continuing route to a selected destination outside of the open area map 801) may be calculated and/or displayed based on route calculation of the geographic map 805. The navigation or routing of the geographic map 805 may be different than the point-to-point routing of the open area map 801. For example, the routing of the geographic map 805 may be based on vehicle navigation attributes of set roadways. Alternatively, the open area map 801 may be positioned in or associated with the geographic map 805 without being linked or tied in with navigation or routing features or functions of the geographic map 805.

Figure 9:
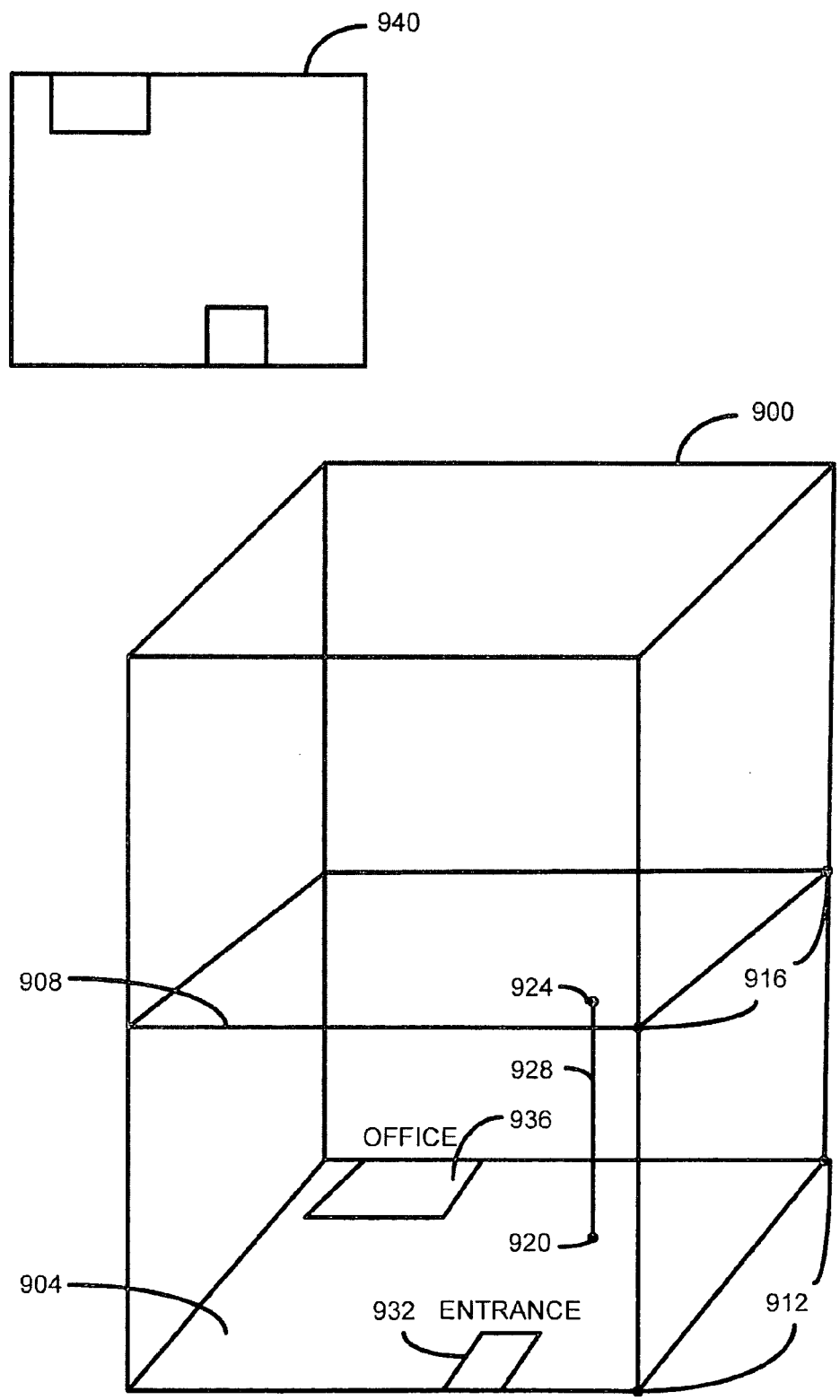
FIG. 9 is a graphical representation of a structure associated with one or more open area maps.

FIG. 9 is a graphical representation of a structure 900 associated with one or more graphical representations of floors 904 and 908 (hereinafter referred to as "floors 904 and 908"). The graphical representations of FIG. 9 may be provided in or on a graphical user interface that may be associated with the display 124, 140, or other display. Also, data, software, or instructions used to organize, configure, execute, or display the graphical representations may be provided. The graphical representation of the structure 900 may represent a building or other structure associated with an open area map. For example, the graphical representation 900 is a representation of a building. The floors 904 and 908 represent different floors of the building that correspond to respective open area maps (e.g., floor plan maps). More or less floors or open area maps may be provided. The graphical representation of the building 900 or data thereof may be placed in a real-world geographic map or database based on the real-world coordinates 912 and/or 916, such as the coordinates 813. A graphical representation 928 represents a connection, such as an elevator, stairs, or an escalator between the floors 908 and 904. The graphical representation 928 is shown as a line between respective connection points 920 and 924. Alternatively, a graphical representation of an elevator, stairs, or escalator may be used.

The floors 904 and 908 may include or comprise respective routable open area maps, such as the open area maps 601 and 700. For display purposes, when the floors 904 and 908 are displayed or shown in the graphical representation 900, all or some features or regions of the respective open area map, such as image reference objects or areas and/or associated text, may or may not be shown or displayed. For example, the floor 904 is provided in the graphical representation 900 with image reference objects or regions 932 and 936 (e.g., some or all portions of the open area map are overlaid, on top of, or in the floor 904, or the floor 904 is the open area map. The reference object or region 932 may correspond to an entrance or exit that is linked to an external or associated real-world geographic map for routing purposes. Alternatively, the routing or navigation of the open area maps may be independent or separate from routing or navigation of an associated geographic map. The graphical representation 900 and floor thereof may be positioned in or aligned with a real-world geographic map based on real-world coordinates and/or road network data. The open area maps associated with the graphical representation may be displayed with the real-world geographic may or a portion thereof. Also, multiple open area maps, such as the open area maps corresponding to the different floors or an open area map having image data corresponding to a bi-level or multiple levels, may be displayed with each other based on local (such as coordinates that do not correspond to real-world positions) or global coordinates or other content with or without displaying the real-world geographic map.

In one embodiment, the text, name, or descriptions associated with each image reference object or region may be displayed or shown above or hovering over the respective object or region. For example, the description "Entrance" hovers over or is above the image reference object 932 and the description "Office" hovers over or is above the image reference object 936. Alternatively, the text, name, or description may be placed or displayed on the same level or on top of the respective object or region, as in the open area map 601 or 700. Or, a text, name, or description may not be displayed.

The floors 904 and 908 are configured to be selected. For example, an end user or user may "click on" or select the floor 904 or 908 to view or activate an open area map for routing. In one embodiment, a user uses an input device to select or activate the floor 904, and based on the selection, the respective open area map is fully displayed for point-to-point routing, such as the open area map 601 or 700. A new screen or window may be used to display the selected open area map. Alternatively, a separate window or screen within the same screen shot of the graphical representation 900, such as a screen or window 940, may be provided.

Also, selection of an open area map of floor may include highlighting or previewing the floor or open area map with or without choosing the open area map for routing purposes. For example, a user may hover over (e.g., placing a mouse, finger, stylist, or other input device over or on the floor 904 or 908) the floor 904 or 908. Hovering or selection may highlight the respective floor. For example, the selected or previewed floor may glow or be associated with a highlighted color, the floor may partially or fully move out from the graphical representation 900 (e.g., the floor or open area map pulls out like a shelf from a drawer), and/or the respective open area map may be displayed in a separate window or screen, such as the screen 940.

In one embodiment, a graphical representation or an image of a layout, such as the image 201, is obtained or received. For example, a map developer using a workstation, computer, or other device, such as the device 112, downloads or requests a pre-existing image of a layout, such as a building floor plan, via the Internet or other network or connection, such as the network 108. The graphical representation of the image may be stored or located at a website, server, file, another computer or other device, or any other storage device or area, such as the image source 104. The image of the layout may be received wirelessly and/or through a wired connection. The received image may be modified. For example, eraser or drawing tools or functions may be provided so that the map developer can add or remove image features. In some cases, doors or openings may need to be added for routing purposes.

A grid, mesh, or array, such as the grid or array 300, is applied or overlaid on or over the image of the layout, a copy of the image of the layout, or a modified image of the layout. The map developer assigns a scale by designating a distance measurement within the layout. For example, using a mouse or other input device, such as the input device 136, the map developer selects a space or distance between image objects, such as the image objects 217, 221, 225, 229, 233, 237, 241, and 245, representing a width or length of a hallway or area. The map developer then assigns a value to that space or distance, such as 1 meter or 3 meters. Alternatively, designating a distance measurement may be entered via a "pop-up" screen or a fill-in box, or the distance measurement may be automatically implemented based on pre-existing distance markers in the image or pre-determined parameters. By assigning a scale, an understanding of distances between objects and areas within the layout is achieved.

The grid or mesh is then applied on the image of the layout, or the grid or mesh is applied before assigning the scale. For example, a grid covering substantially the entire image of the layout is provided. Alternatively, certain or specific portions are chosen for applying the gird. In one embodiment, the grid may be applied to only areas designated for walking between reference objects, such as hallways or other ground or open areas. Therefore, the grid or mesh does not intersect borders, barriers, and/or walls within the image. Also, the grid or mesh may be applied on internal areas, such as areas within a room or image reference object. The map developer may choose where to apply the grid, portions of the grid, or multiple grids that may be joined via the input device. For example, the map developer may click on or select a hallway area within the layout to apply a grid throughout the hallway area. In alternate embodiments, a grid or a portion thereof is automatically overlaid over substantially the entire image of the layout or portions of the layout based on color/image recognition or other parameters.

The grid, mesh, or array is composed of tiles, blocks, sections or areas, such as the tiles 304, or similar or corresponding dots or points, as mentioned above. Based on the scaling, the tiles are assigned or correspond to a measurement value. For example, each tile may have a measurement value of about 1 square meter, ¼ square meter, or other value. Alternatively, each tile may have any other measurement value or different values from each other. The resolution or number of tiles or points may be adjusted by the map developer or automatically. For example, for a finer resolution, the grid or mesh may be adjusted or changed to include more tiles or points, and for a lower resolution, the grid or mesh may be adjusted to include fewer tiles or points. The adjustment of the number of tiles or points may be based on the number or positioning of image reference objects within the layout and/or other factors. For example, the size of the tiles may be selected to match a human or pedestrian scale so that at least one navigable tile may fit in narrow or narrowest passages in the real world environment. A maximum tile size (e.g., at most about 15, 20, or 30 inches in length and/or width or other length, width, dimensional, and/or area value) may be chosen or be pre-determined to allow for navigable tiles to be placed in the narrowest or smallest areas, hall, or corridors for routing. An appropriate tile or area size is chosen to avoid the lack or inability of routing in some suitable areas of the layout. Also, non-uniform sized tiles and/or shapes may be used for different areas. For example, larger areas may use larger sized tiles and smaller or narrow areas may use finer or smaller sized tiles.

Local or global map coordinates are assigned or designated. For example, center of the tiles or other parts of the tiles (or points or dots of an array or grid) are given a (x,y), latitude and longitude, or other coordinate designation. An origin is selected by assigning a (0,0) or origin point to one of the tiles (e.g., a corner tile). The coordinates can be used for searching or identifying reference image objects, reference regions, or other features or vice versa. Point-to-point routing may, however, be based on adjacent or contiguous tiles, and, therefore, the coordinates may not be needed for routing calculations. Alternatively, the coordinates may be used for distance and cost determinations when calculating a route.

A routable map, such as the map 601 or 700, is generated or created based on or as a function of the grid or mesh. A non-navigable area is designated in the grid or mesh. For example, the map developer clicks on or selects areas within the layout of the image to convert them to non-navigable tiles or areas, such as the non-navigable tiles or areas 401. The map developer may select images of walls or barriers that cannot be walked through in the real world as non-navigable areas. The selection may assign tiles with a non-navigable status or may remove tiles. The designation of non-navigable areas may also be automated. For example, instead of selecting multiple areas in the image to be non-navigable, the map developer may click on or select a wall or barrier to be non-navigable and all other features or image objects with the same or similar color or pixel level of the selected wall or barrier may automatically be associated with non-navigable areas or tiles. Alternatively, pre-determined color or pixel levels or image recognition factors may be entered so that non-navigable tiles or areas are automatically generated once a grid is overlaid without involvement of a map developer or other entity. In such automated cases, graphical representations of text or descriptions of image objects in the layout may be removed or separated prior to designation of non-navigable areas. This is so because the descriptions may be mistakenly assigned as non-navigable areas. Alternatively, a non-navigable area may be designated by originally not applying a grid or a portion thereof to areas intended to be non-navigable.

A plurality of reference regions or areas are generated. The generation of the reference regions occurs on a different spatial layer than the grid or mesh. The grid or mesh may or may not be viewed when creating the plurality of reference regions. In one embodiment, the plurality of reference regions are automatically or semi-automatically generated. For example, a plurality of reference image objects are identified or determined in the image, such as the image 201, which may be a raster image or a vector graphics image. A raster image of the layout is binarized. Binarization of the image allows for logically comprehending the layout by using digital 1's and 0's. For example, a Trier-Taxt binarization is used. The Trier-Taxt binarization provides for edge preservation. Alternatively, other binarization techniques or methods may be used. The binarization may depend on three parameters or factors, such as a sigma, an activity threshold, and a pruning factor. Alternatively, more or less factors may be considered.

The sigma is a larger sigma rather than a lower sigma that may correspond to noise sensitivity. Activity at a pixel may be proportional to a local average of a gradient magnitude, and pixels with lower activity than the activity threshold may be set to zero. The pruning factor is used for removing small connected components. In one embodiment, the sigma is set to about 1, the activity threshold is set to about 2, and the pruning factor is set to about 1. Alternatively, the factor values may be set to any other value and may be adjustable.

Regarding identification of the reference image objects, a text/graphics separation is performed after binarization. For example, the graphical description or text corresponding to each of the reference image objects is separated from the respective image objects. Any future or past graphics-text separation may be used. The separated text is linked to or identified with the respective image object. For example, a text region may be designated in each of the reference image objects. After the separation, OCR is performed on all or some of the graphical descriptions to convert them into searchable text, such as the text 504, or text that can be recognized as having meaning or a definition rather than a graphical representation of text. Separation of the graphical descriptions may facilitate or improve the OCR. Alternatively, the OCR may be performed without the separation. Text aliasing may be reduced by doubling or increasing resolution of the original image of the layout, such as by using Lanczos re-sampling before applying OCR. In alternate embodiments, other text recognition methods, functions, or algorithms may be used.

The plurality of reference regions, such as the reference regions 500, are generated by forming borders or boundaries corresponding to the respective reference image objects. For example, after binarization and/or graphical description separation, the reference image objects are vectorized. Lines or vectors are generated or created between the digital or binarized data points to form shapes corresponding to the image objects within the layout. For example, the Rosin and West vectorization algorithm is used. Alternatively, other future or past vectorization algorithms may be utilized.

Closed polygons are identified to determine the reference regions associated with the original reference image objects. For example, based on the vectorization, closed polygons or other shapes are determined. The closed polygons may be determined via planar curve, vertices, edge, and/or face techniques. Any future or past computational-geometry algorithms or methods may be used. A closed polygon may correspond to an office, a room, or other area.

Some reference image objects may include gaps or symbols of doors, such as the gaps or symbols 249 and 253. For the purpose of determining reference regions, all line segments identified in the vectorization may be visited to determine or identify gaps that can be closed to form a closed polygon. The gaps are closed to identify the respective reference regions. Regarding symbols of doors, the map developer may identify or provide information that links a unique symbol, such as the symbol 253, to a door, opening, entrance, and/or exit. The association may be stored in a memory or look-up-table. After or during vectorization, the symbols of the doors can be identified based on matching and replaced with gaps. The gaps are then closed to identify the respective reference regions. Alternatively, a line or vector replaces the symbol of the door to close the polygon rather than forming a gap and then closing the gap. Multiple gaps or symbols of doors for a given image object may be visited or closed to form a closed polygon for determining a reference region. The gaps or symbols of doors correspond to navigable tiles on the grid that is in a separate spatial layer relative to the reference image objects. The doors or openings may be inferred by comparing the navigable tiles of the grid with respective reference regions.

The names or text associated with each of reference image objects are populated in a name attribute corresponding to the generated reference regions. For example, the text generated from the OCR is associated with text regions of the generated reference regions. A look-up-table, database, or other memory feature links the text descriptions to each respective reference region. A question and answer feature or a verification function may be implemented so that the map developer can correct errors in the generated text or association of text with reference regions. A reference region may be searchable based on the associated text and vice versa.

The reference regions may also be associated with a reference type. For example, each reference region may correspond to or be designated a type, such as a restaurant, office, department store, grocery store, bathroom, or other designation, based on the associated text, function, purpose, and/or other factors of the reference region. These types or keywords may be stored in a database or look-up-table and may be linked or associated with respective reference regions. The type or tag may be more specific, such as particular names of stores or areas (e.g., McDonalds™ restaurants) that may or may not be different than the generated text or name. Also, logos and/or respective websites may be associated with the reference regions. A reference region may be associated with one or more types or tags and may be searchable based on the types or tags.

The reference regions and associated text and type may be generated manually instead of or in addition to being automatically generated. For example, the map developer, using program or application tools, may outline or replicate the reference image objects in the original image of the layout to generate the reference regions, such as the reference regions 500, in a spatial layer separate from the grid or mesh. Also, the map developer may read or view the original descriptions of the reference image objects and enter, input, or type in equivalent text, such as the text 504, and/or types to be associated with the generated reference regions.

The generated data or data layers associated with a digital open area map, such as the grid or array and the reference regions are stored, such as in the database 170. Separate data or spatial layers may be stored as individual XML files or other data. For example, data corresponding to the underlying image, the grid, cost, restrictions, and/or the reference regions are saved or stored. Position or location information or data corresponding to the grid or respective tiles (such as regular-sized tiles) as well as the reference regions or other data are also saved and/or provided in the data structure. The position information is used as a spatial reference regarding appropriate location of the different data entities. The position information may be based on an original scale, a reference, or coordinates, such as relative to the underlying image. The database 170 may compile the separate data layers to form a routable open area map. Accordingly, the database 170 may stream or send the compiled open area map data to the end user device. Alternatively, separate data layers may be sent to the end user device for compilation on the end user device. Also, a compiled open area map file or data may be stored in the database 170 rather than storing separate data layers.

Furthermore, compiled or uncompiled open area maps or data thereof that are stored in the database 170 may be positioned with data in the database 160. For example, data from the database 170 may be linked with or transferred to the data in the database 160, or vice versa.

Different spatial or data layers are compiled or combined to form an open area map, such as the open area map 601 or 700, that is routable. For example, the plurality of reference regions including the associated text and tags are compiled with the grid or mesh. The compilation links or associates respective tiles to the generated reference regions (such as tiles that are to be within a reference region, substantially adjacent to the reference region, and/or touching or intersecting a border of the reference region) for search, navigation, routing, and other purposes. Also, connections or connections points, which may be generated on a separate spatial layer, may be compiled with the grid and the plurality of reference regions. Other components or features, such as restrictions or cost features, that may be on separate or different spatial layers may also be compiled with the grid or mesh. Any future or past compilation technique or method may be used. Alternatively, the grid, reference regions, and/or connection points, as well as other features, may be generated and exist on the same spatial or data layer rather than different layers. Accordingly, a final compilation may not be required. Also, some spatial layers may not be compiled or may not be used. For example, routing may be accomplished using navigable and non-navigable tiles without associating the tiles with generated reference regions.

Another or second graphical representation or image of a layout, such as an image similar to the image 201, is obtained. For example, the second image may be an image of a floor plan of another floor of the building. The second image may be obtained or received by the map developer in a similar manner as the first image was obtained.

Another grid, mesh, or array is applied to the second image. Another or second routable map is generated based on or as a function of the second grid. The first and second routable maps are linked or associated with each other, such as via one or more connections or other features. For example, a connection point in the first routable map is associated with a connection point on the second routable map for routing purposes. The connection points may correspond to an elevator connection, such as the connection points 613 and 708, or other connection linking two floors of a building or other areas. Alternatively, one or the same connection point is used to link the two routable maps. Any number of routable maps may be linked together via one or more connection points or other features (e.g., 1 to an Nth number of routable maps corresponding to different floors of a building or other areas may be generated and linked or associated together).

Figure 10:
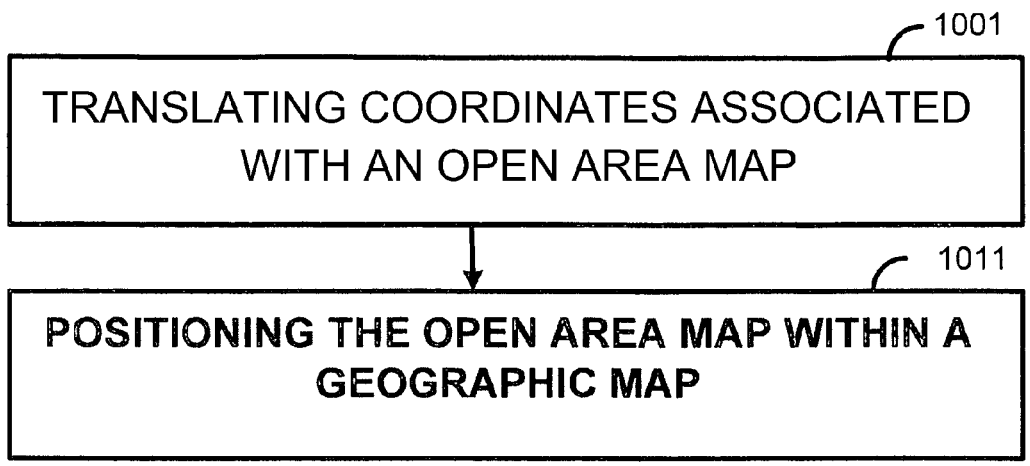
FIG. 10 is a flowchart of a method of placing an open area map.

FIG. 10 is a flowchart of a method of placing an open area map or portions thereof, such as the open area map 601, 700, 801, or open area maps associated with the floors 904 and 908. Fewer or more steps or acts may be provided, and a combination of steps may be provided. Also, the steps or acts may be performed in the order as shown or in a different order. The method is implemented by the system and/or devices described herein or by different devices or systems.

In one embodiment, after one or more open area maps or data layers thereof are created or generated, a map developer or other entity may want to place or position a generated open area map or data thereof in a geographic database, such as the geographic database 160, or other real-world map. The geographic database 160 may be in a production format (such as an Oracle spatial format), a delivery format (such as a GDF format), or a format suitable for performing navigation-related functions (such as a PSF format). Depending on the format of the database 160, the open area map or data thereof may be fully incorporated in the database 160 or may be linked (such as in a reference table) with the database 160.

Coordinates, such as the coordinates 813, 912, or 916, associated with an open area map or portions thereof, such as the open area map 601, 700, or 800, are translated, transformed, or converted into real-world coordinates (Step 1001). For example, local or assigned coordinates associated with tiles, other portions of the generated open area map, or a graphical representation associated with the open area map may be translated or changed into real-world global coordinates, such as UTM coordinates or longitude and latitude coordinates as well as elevation, altitude, or 3D points. Alternatively, the coordinates associated with a grid, portions of the open area map, or graphical representation of the open area map may be already be in real-world coordinates. Parts of the open area maps or data thereof may be skewed or distorted for positioning and/or display purposes. For example, in positioning a portion of an open area map for a 3D view, perspective, or position, shapes or content of the open area map may be skewed, stretched, reshaped, or changed for proper positioning or alignment.

The open area map or portions thereof (or associated data or representations) are positioned, placed, aligned, or linked with or within a geographic map, such as the geographic map 805 or the geographic database 160, as a function of the real-world coordinates (Step 1011). For example, the map developer or other entity, using editing tools or a software application, places or positions data of the open area map within an accurate real-world area of a geographic database or real-world map based on the real-world coordinates via wireless or wired connections or protocols. Data or data structure of the routable open area map or graphical representations thereof may or may not be linked to navigation features, points, segments, nodes, points-of-interest ("POI's"), and/or attributes of the geographic database or map. For example, routing and navigation features or functions of the open area map may be linked or associated with routing or navigation functions or attributes of the geographic map.

In one embodiment, an end user, such as a pedestrian, uses a device, such as the device 116, for point-to-point routing or navigation in an open area. For example, one or more routable open area maps or data thereof, such as the open area map 601, 700, or 801, are downloaded or sent to the user device, such as via the connection 120 or other connection. Alternatively, one or more routable open area maps are "pushed" onto the user device via a proximity beacon or transmitter or other device based on location or position.

The user views one or more open area maps, such as via the display 140. An origin or origin point, such as the origin point 609, is selected. For example, the user types in or enters an area or point of origin that acts as a starting location for routing. The user may enter a name or text describing a reference region, and the respective area in the open area map may be allocated as the origin point based on searching or accessing a look-up-table linking reference regions with names or text. Alternatively, the user may click on, select, or physically touch an area on the open area map (i.e., touch the display screen) to choose the origin point.

The origin selected in the open area map is identified. For example, one or more tiles associated with the origin point or reference region associated with the origin point is determined, considered, recognized, targeted, focused upon, and/or highlighted for route calculation.

A destination or destination point (i.e., the place or area the user wants to be routed to), such as the destination point 712, is selected by the user in a similar manner to selecting the origin point or through different methods. The destination selected in the open area map is identified in a similar manner to identifying the origin point or through different methods.

A route from the selected origin to the selected destination in the open area map is calculated. For example, adjacent or connected tiles that are navigable, such as the tiles 304, are assessed to determine an optimum or preferred route from the origin point to the destination point. Non-navigable areas or tiles, such as the tiles 401, are avoided or routed around. One or more possible routes may be calculated using geometric and/or mathematical functions or algorithms. For example, centers or other locations of each of the tiles are connected or associated with each other to form potential routes. An optimum route is chosen based on distance as well as other factors, such as cost, restrictions, or user preferences that may be inputted (e.g., a user may want a route to avoid or pass by a desired area). The user preferences may be based on classification or sub-classification of tiles. For example, each or some tiles are associated with a feature related to position, location, and/or type of area (e.g., major, intermediate, or minor corridor, hallway, pathway, or area, high or low traffic area, unpopular or popular area, scenic area, narrow area, isolated area, sloped area, flat area, carpeted area, or size, length, or width of an area). The tiles may also be sub-classified based on what reference regions or areas they are linked to, proximate to, or pass by. Different tiles may be ranked or ordered based on the sub-classification. In one embodiment, the user may input or choose to avoid high traffic areas or major corridors when routing.

A Dijkstra method, an A-star algorithm or search, and/or other route exploration or calculation algorithms may be used to form lines, curves, or routes between the points of the connected tiles. A Douglas-Peucker method or algorithm may be used to smooth or simplify the calculated lines or routes. For example, by connecting the center of adjacent tiles together, jagged, sharp, or triangular edges may be formed in the route from the origin point to the destination point. To minimize distance and provide a smooth line or curve for the route, the Douglas-Peucker algorithm can find or provide an averaged route from the origin to the destination. The Douglas-Peucker algorithm is modified to avoid non-navigable tiles and may be adjusted to change threshold levels for line smoothing or averaging. Alternatively, other line smoothing algorithms or methods may be used.

Calculated routes and generated paths may be saved or stored for future use. For example, once a path is generated, it may be saved as a pre-determined path that can be reused when a user desires to be routed from the same origin to the same destination. Some, rather than all, paths or routes may be saved. For example, routes or paths between major or popular reference regions may be stored while paths regarding less traveled or minor reference regions may not be stored. Also, partial routes or paths may be stored in which some parts of the path, not the entire path, are saved. Additionally, routes or paths between connections or connection points may be pre-calculated or predetermined and stored for routing. For example, a user may want to route from one point to another in which one or more connections may be used. In this case, a route is calculated from an origin to a connection as well as from the other connection to the destination, and the route between the connections has already been calculated, which saves time and processing. Routes may be stored, saved, ranked, or ordered in multiple data layers. For example, higher layers may include main, major, or more important routes. Alternatively, routes and paths are always recalculated and regenerated.

A path from the selected origin to the selected destination is generated based on the calculation of the route. After or during calculation and selection of one or more routes, all of the tiles associated with an optimum or preferred route are identified or determined as the path. For example, the Douglas-Peucker algorithm or other algorithm may form a line and/or curve that passes over certain navigable tiles. Those tiles are then identified, entered, stored, or highlighted as the path for the user to take to go from the origin point to the destination point. The determined path then is displayed, such as the displayed path 605 or 704, to the user in the open area map for routing purposes.

Figure 11:
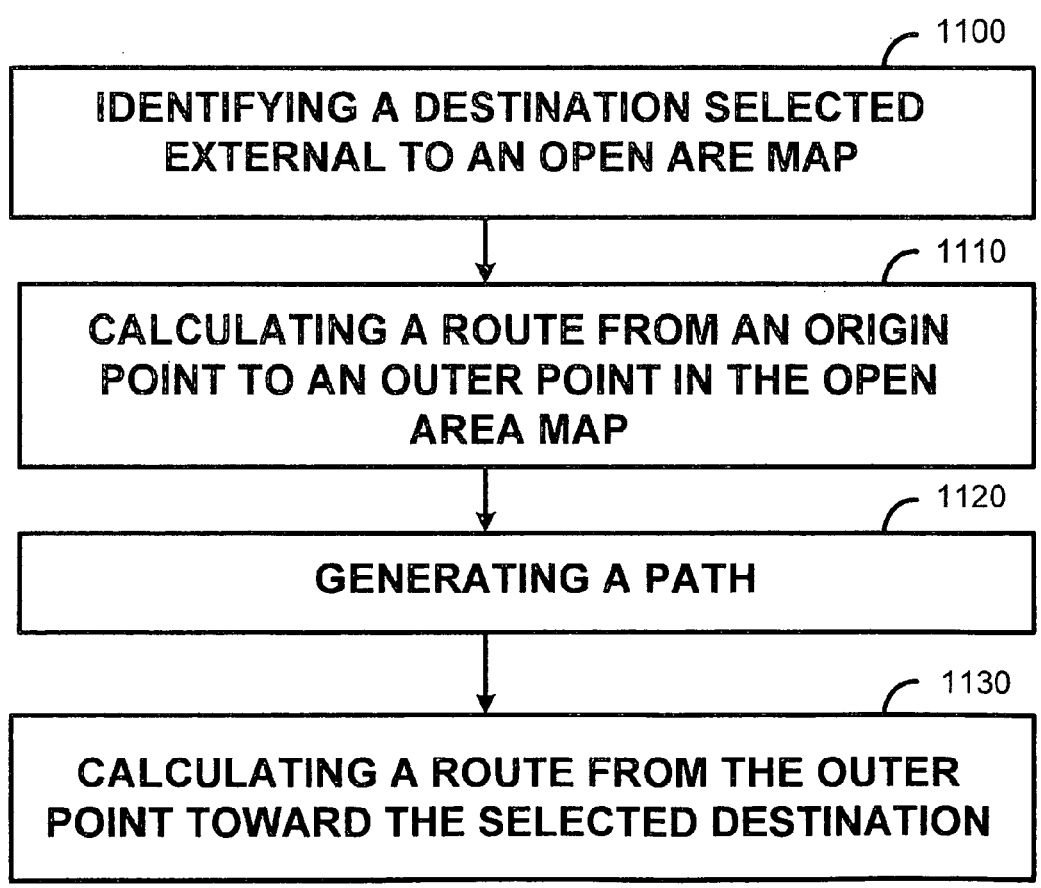
FIG. 11 is a flowchart of a method of routing using an open area map.

FIG. 11 is a flowchart of a method of routing using an open area map, such as the open area map 601, 700, 801, or open area maps associated with the floors 904 and 908. Fewer or more steps or acts may be provided, and a combination of steps may be provided. Also, the steps or acts may be performed in the order as shown or in a different order. The method is implemented by the system and/or devices described herein or by different devices or systems.

For example, an end user may wish to route from inside a building or open area map to an area or point outside the open area map. In one embodiment, the open area map is linked to a street map or real-world geographic map, such as the geographic map 805, that may be configured for navigation and routing.

A selected destination or destination point external to the open area map is identified (Step 1100). For example, the end user types in or selects a destination address, POI, or area, such as via the user device 116 or other device. Also, an origin point is selected or identified in the open area map.

A route is calculated from the origin point in the open area map to an outer point, such as a point in the exterior region 205 (FIG. 2) or a point in the reference area 932, in the open area map (Step 1110). The route is calculated based on algorithms and methods described above regarding routing in an open area map. The outer point may be chosen for routing because it may be associated with a link or point for routing or navigation in the surrounding real-world geographic map or database. Alternatively, the outer point may be a point that is substantially close to the real-world geographic map or data thereof.

A path, such as the path 605 or 704, is generated from the origin point to the outer point based on the calculation (Step 1120). The path may be generated and/or displayed as described above.

A route is calculated from the outer point toward the selected destination based on the geographic map or real-world map (Step 1130). The real-world geographic map may provide routing or navigation in a different scheme or way than the open area map. For example, the real-world geographic map or database provides vehicle or pedestrian navigation or routing on real-world roads or streets based on nodes, segments, and/or collected attributes. In one embodiment, the outer point is linked with navigation attributes or features of a vehicle navigation map or database. Accordingly, the route, such as a continuation of the route in the open area map, from the outer point toward the selected destination may be calculated based on vehicle navigation attributes and associated road networks. The route calculation toward the selected destination may be a seamless or automatic transition or handoff from the open area map to the surrounding real-world geographic map. The route may be calculated from the outer point or a point linked or associated with the outer point (such as a nearby or proximate point or area in the real-world geographic map) to the selected destination. Alternatively, the route may be calculated from the outer point or a point linked or associated with the outer point to an area or region that is closer to the selected destination relative to the outer point or origin point of the initial open area map. For example, the selected destination may be in another open area map positioned across a city or area, and, therefore, the route calculation in the real-world open area map may generate or provide a route, such as a vehicle or car route, to an area or point near or in an outer region of the open area map that includes the selected destination. Then route calculation within the open area map provides a final or continued route to the selected destination. Alternatively, instead of or in addition to routing from an open area map to a location in an external real-world geographic map, one may route from a point in the external real-world geographic map to a point in an open area map. Also, instead of or in addition to having automatic or seamless connection or continued routing between the initial open area map and the real-world geographic map, separate route calculations may occur. For example, an end user may route from an origin point to an outer or destination point in the open area map. Then the end user may route from an outside location or outer region of the open area map to or toward a destination in the real-world geographic map (e.g., routing between new origin and destination addresses or points using a vehicle navigation map). The same or separate devices may be used for the different route calculations. Also, pre-computed or predetermined routes between connections or connection points that connect open area maps to external or other real world geographic maps may be saved or stored. This may allow routes to cut or pass through parks, buildings, or other open areas as necessary.

A path of the route calculated in the real-world geographic map may be generated and/or displayed. For example, a vehicle route from the initial open area map toward the selected destination may be displayed on the same user device used for the open area map routing. In one embodiment, the end user uses a handheld device to view the open area map route to the outer point, and then the handheld device shows the vehicle route toward the selected destination before, during, or after the end user enters a vehicle or car. Alternatively, the route in the open area map is displayed on a user device separate from the device used for displaying the route in the real-world geographic map. For example, the end user uses a user device, such as the user device 116, to view the route in the open area map, and then the end user uses an in-board vehicle navigation system or separate portable navigation device to view the route in the real-world geographic map. The route data of the different maps may be migrated, transferred, or synchronized between user devices.

Animation may be used to display transitions between or within open area maps and/or real-world geographic maps. For example, when a route is calculated between floors of a building, such as a connection in the graphical representation 900, an animation may be generated and/or provided showing movement from one floor to another (e.g., an elevator animation). Also, animation or graphical movement may be provided when transitioning between a road or street map and an open area map or a graphical representation including the open area map.

In one embodiment, the user may receive partitioned data when using the open area maps for routing and/or navigation. User devices, such as the device 116, may include resource constrained components in which processing speeds, memory, or other features may not be as high, fast, or large as other devices. Accordingly, instead of downloading or executing all the data associated with multiple open area maps at the same time, data may be received or executed on an as needed basis. For example, a user may download or initiate one open area map or a portion thereof when beginning navigation (e.g., a first floor or a part of the first floor including the origin is displayed or loaded for routing). Then when the user enters or is routed to a connection or connection point (e.g., to go to a second or other floor or area), the connected open area map data is then downloaded or initiated for continuing the routing process. Also, different spatial layers or features of an open area map may be downloaded or executed on a partitioned basis or at different times.

The open area maps discussed above may or may not include navigation related attributes or nodes and road or path segments that are collected and organized into a geographic database, such as used for in-vehicle navigation systems, portable navigation devices, real-world vehicle navigation maps, and/or real-world pedestrian navigation maps. The navigation attributes may include turn restriction content, speed limit information, optimal or popular path data, footpath content, sign information, and/or other attributes for performing navigation related functions, such as route calculation, destination time calculation, route guidance, and/or other real-world navigation functions.

Alternatives

In the description above, the open area maps used for routing focus on building floors or floor plans. However, the features described may be used for any number of open areas. For example, images of layouts of parks and outdoor environments may be obtained and used to generate routable maps, as described above. Different sections of a park, such as picnic areas, jungle gyms, slides, restrooms, and other areas, may be defined as separate reference regions. Therefore, routing can be generated over grassy areas similar to routing between offices mentioned above. Parks may have walking paths that may be incorporated in routing. Alternatively, pre-determined walking paths or routes may be avoided in routing. Also, non-navigable tiles may be used or implemented for borders or barriers. For example, lakes, ponds, or other water areas in the park may be bordered with non-navigable tiles so that one is not routed through water. Other barriers or desired boundaries, such as hazardous areas, train tracks, or rocks, may be associated with non-navigable tiles. Alternatively, navigable tiles may be used if there is a reason to pass through some of these boundaries. For example, if a boat exists to take a person from one side of a lake to another, then a boat area may be associated with navigable tiles.

The tiles or objects associated with the image of a park or outside area may be sub-classified. For example, some tiles may be associated with grass areas and some tiles may be associated with sidewalks. A user or other entity may input a preference, such as grass only, sidewalk only, or other designation, for routing purposes. Accordingly, routes may be generated by avoiding or using certain specified tile types (e.g., generating a route over only grass areas and avoiding sidewalks or vice versa).

In another embodiment, a pre-exiting image of a parking lot may be obtained and used to generate a routable open area map. Each of the individual parking spaces may correspond to different reference regions. The outlines of the parking spaces may be considered barriers that may or may not be associated with non-navigable tiles. For example, the outlines of the parking spaces may be designated as non-navigable areas so that a route is not generated through parking spaces (e.g., for safety to pedestrians, cyclists, or others, and also for practicality because the spaces may be filled with cars). However, certain areas of the outlines of the parking spaces may be designated as navigable to simulate the concept that pedestrians may walk or navigate between parked cars. The parking lot may have multiple levels of parking floors, which may be associated with each other via a connection, such as the connection 405, 613, or 708, representing an elevator, stairs, or other connection.

Other areas or environments may be used to generate routable open area maps. For example, pre-existing images of amusement parks, malls, museums, and other indoor or outdoor areas may by obtained and used for generating routable maps or plans. In one embodiment, an image of a trade show area or floor plan or other temporary layout may be obtained. For example, the layout setup for a trade show may last or exist for only about a week, less than about 3 months, or other time periods. The image of the temporary layout may be obtained and used to generate a routable open area map as described above. Therefore, after a certain time period (such as less than about 3 months or other temporary time period), the generated routable map may no longer be applicable for the location or area. Also, the generated open area map may be time boxed based on the time period of the temporary layout. For example, the open area map or portions thereof, such as reference regions or other features, may disappear, be erased, or be inoperable when the actual layout is changed or taken down after the allocated time period. The open area map or features thereof may be erased by the executing device based on a timer within the device or a communication or signal from an outside source. Also, events or features associated with certain reference regions may be time boxed or used to time box the specific reference regions. For example, a speech, show, or activity may occur at a specific area (e.g., reference region) for a certain time period. Accordingly, the reference region may be only routable or may only exist for the specific time period associated with the speech, show, or activity. In another alternate embodiment, reference regions may be mobile, such as a mobile truck or moveable store, which makes the reference regions temporary for a specific location. Or, reference regions may be routable for a temporary time period based on how long an item is on sale for a given reference region, store, or stall.

In the description above, the application of the grid or mesh focuses on, but is not limited to, a two-dimensional format. The grid or mesh may be a three-dimensional grid or mesh including points or coordinates in an x, y, and z direction (e.g., the coordinates may include longitude, latitude, and altitude information or local coordinates). For example, the image of the layout obtained may include three-dimensional features. For example, a floor plan may have floor ramps, steps or stairs, a bi-level area, or other features that are displayed or designated in three-dimensional space. Also, a hill or peaks and valleys in a park area may be displayed or provided in a three-dimensional space. Therefore, a three-dimensional grid or mesh may be applied on or over the image to generate a routable open area map as described above. The addition of the z direction may require additional calculation for determining a route and/or path. For example, height may be a factor in determining an optimum or preferred route. Instead of using square tiles, triangular sections or tiles may be used for the three-dimensional grid or mesh. Alternatively, other geometrical shapes may be utilized.

A three-dimensional grid or mesh may be used for routing a person from one point to another in addition to helping a person find an object. For example, images of layouts of a grocery store or retail store having vertical shelves of products and goods may be obtained. A three-dimensional grid may be applied in which the floor area is overlaid with two or three dimensional tiles, and the vertical shelving areas are overlaid with a grid or mesh as well. Different products or goods on the shelves may be designated as reference regions. Accordingly, an open area map may be generated that can route a shopper or user to one place in the store to another place where a product can be found on a proximate or nearby shelf. Then a route can be calculated on the grid over the shelf or vertical area pointing to the specific or selected product. The shopper or user may not walk on the shelf, but the route may be useful in showing the shopper or user where exactly the product is on the shelf. Or, a route can be calculated to end at a ground or floor tile that is nearest to the shelf.

In another embodiment, instead of and/or in addition to using a grid, mesh, or array, as described above, color may be used to designate navigable and non-navigable areas. For example, the color white may be associated with navigable areas and the color black may be associated with non-navigable areas. Any number and types of colors may be used. Accordingly, routes may be calculated based on the placement of respective navigable and non-navigable colors. For example, paths or routes may be generated within navigable colored areas and around non-navigable colored areas based on distance algorithms. Also, different shades of color or gradation of color may be used as factors or cost for calculating or generating routes.

Furthermore, as described above, a map developer obtains an image and uses a workstation, computer, and/or device, such as the device 112, to generate a routable open area map. The open area map is then received by an end user or at an end user device, such as the user device 116. However, an end user or other entity separate from a map developer may obtain an image of a layout and generate a routable open area map automatically and/or manually. For example, an end user may obtain and/or purchase a software application for creating open area maps from a map developer or other entity. The device 112 (FIG. 1) may be operated by an end user, such as a personal computer. Alternatively, instead of using the device 112 to generate a routable open area map and sending the open area map to the user device 116 for use, the user device 116 may be used to generate and use a routable open area map, bypassing the device 112. Or, the device 112 and the device 116 may be combined into one device or system.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

We claim:

1. A method comprising:
   translating coordinates associated with an open area map into real-world coordinates; and
   positioning the open area map within a geographic map as a function of the real-world coordinates, the geographic map representing a real-world area around the open area map, wherein the open area map is stored on a non-transitory computer readable medium,
   wherein the open area map includes an image of a layout representing a floor plan including a pedestrian walkable area, wherein a grid is associated with the image of the layout representing the pedestrian walkable area, the grid including a plurality of contiguous tiles, wherein at least a portion of the grid is designated as navigable and associated with a navigable area in the layout representing the pedestrian walkable area, and
   wherein the open area map is displayed on a user interface of a device and configured to provide point-to-point routing within the navigable area as a function of the grid, the point-to-point routing including calculating a route formed of any adjacent tiles of the plurality of contiguous tiles such that any area of the grid designated as navigable can be routed to,
   wherein at least two of the plurality of contiguous tiles are connection tiles, each of which link to a different a road segment of the real-world area around the open area map and external to the open area map, and
   wherein the route includes the at least two connection tiles, the road segments, and the adjacent tiles of the plurality of contiguous tiles.

2. The method of claim 1, wherein the real-world coordinates comprise Universal Transverse Mercator coordinates.

3. The method of claim 1, wherein the real-world coordinates comprise longitude and latitude coordinates.

4. The method of claim 1, wherein the geographic map comprises a road network map configured to provide real-world vehicle navigation functions.

5. The method of claim 1, wherein the image of the layout comprises an image of a building floor plan, a park layout, or a parking lot layout.

6. The method of claim 1, wherein the contiguous tiles of the plurality of contiguous tiles are uniformly spaced.

7. The method of claim 6, wherein a portion of the plurality of contiguous tiles is designated as non-navigable.

8. The method of claim 1, wherein the open area map is configured to be previewed, and wherein when the open area map is previewed, point-to-point routing is not enabled.

9. The method of claim 1, further comprising:
   displaying an animated transition from the geographic map and the road segment to the open area map and the pedestrian walkable area.

10. An apparatus comprising:
    a display presenting a graphical representation of a building;
    a first graphical representation of a floor within the graphical representation of the building; and
    a first open area map associated with the first graphical representation of the floor, the first open area map including an image of a layout of a first floor plan, wherein a first grid is associated with the image of the layout of the first floor plan, wherein a first portion of the first grid is designated as navigable and associated with a navigable area in the layout of the first floor plan and a second portion of the first grid is designated as non-navigable and associated with a non-navigable area in the layout of the first floor plan,
    wherein the first open area map is configured to provide point-to-point routing within the navigable area in the layout of the first floor plan as a function of the first grid, the point-to-point routing within the navigable area in the layout of the first floor plan including route calculation for point-to-point routing by an end user using the apparatus, wherein the route calculation includes two or more connection links to different road segments in a real-world area around the first open area map.

11. The apparatus of claim 10, wherein the first graphical representation of the floor is configured to be highlighted.

12. The apparatus of claim 10, wherein the first open area map is displayed in a separate window after the first graphical representation moves out from the graphical representation of the building.

13. The apparatus of claim 10, wherein the first open area map or a portion thereof is displayed in the first graphical representation of the floor.

14. The apparatus of claim 13, wherein text associated with the first open area map is displayed above associated regions of the first open area map.

15. The apparatus of claim 10, further comprising:
    a second graphical representation of a floor within the graphical representation of the building; and
    a second open area map associated with the second graphical representation of the floor, the second open area map including an image of a layout of a second floor plan, wherein a second grid is associated with the image of the layout of the second floor plan, wherein at least a portion of the second grid is designated as navigable and associated with a navigable area in the layout of the second floor plan,
    wherein the second open area map is configured to provide point-to-point routing within the navigable area in the layout of the second floor plan as a function of the second grid, the point-to-point routing within the navigable area in the layout of the second floor plan including route calculation not dependent upon one or more path segments external determined prior to point-to-point routing by the end user using the apparatus, and wherein the first open area map and the second open area map are linked via an indoor connection.

16. The apparatus of claim 15, wherein a graphical representation of the indoor connection between the first graphical representation of the floor and the second graphical representation of the floor is displayed.

17. The apparatus of claim 16, wherein the graphical representation of the indoor connection corresponds to an elevator, a stairwell, or an escalator.

18. The apparatus of claim 10, wherein the graphical representation of the building is positioned within a geographic map based on real-world coordinates associated with the first open area map.

19. The apparatus of claim 10, wherein the first grid comprises a mesh including a plurality of tiles.

20. The apparatus of claim 19, wherein the first open area map comprises a plurality of reference regions compiled with the mesh.

21. The apparatus of claim 20, wherein the plurality of reference regions comprise polygons having boundaries corresponding to respective reference image objects in the image of the layout of the first floor plan.

22. The apparatus of claim 21, wherein the boundaries are based on a vectorization of the image.

23. The apparatus of claim 10, wherein the first graphical representation of the floor is configured to partially move out from the graphical representation of the building when selected and wherein the first open area map provides point-to-point routing while the first graphical representation of the floor is partially extended.

24. The apparatus of claim 10, wherein the first graphical representation of the floor is configured to partially move out from the graphical representation of the building when selected, wherein the first graphical representation of the floor is configured to be previewed while the first graphical representation of the floor is partially extended, and wherein when the first graphical representation is previewed, point-to-point routing is not enabled.

25. The apparatus of claim 10, wherein the first open area map is configured to be previewed, and wherein, when the first open area map is previewed, point-to-point routing is not enabled.

26. A method of routing comprising:
identifying a destination selected external to an open area map, the open area map including an image of a layout representing a real-world area in which a person walks about, wherein a grid is associated with the image of the layout representing the real-world area in which a person walks about,
wherein at least a portion of the grid is designated as navigable and associated with a navigable area in the layout representing the real-world area in which a person walks about, and
wherein the open area map is displayed on a user interface of a device and the device is configured to provide point-to-point routing within the navigable area as a function of the grid and outside of the navigable area as a function of one or more path segments external to the open area map;
calculating a route from an origin point in the open area map to a plurality of outer points in the open area map wherein each of the plurality of outer points is linked to one or more path segments external to the open area map;
providing data to display at least a portion of a path from the origin point to one or more of the plurality of outer points based on the calculation, the outer points associated with a geographic map configured for navigation based on a different scheme than the point-to-point routing of the open area map; and
calculating a route from each of the plurality of outer points toward the selected destination based on the geographic map and the one or more path segments external to the open area map.

27. The method of claim 26, wherein the open area map is aligned with the geographic map based on real-world coordinates associated with the open area map.

* * * * *